(12) United States Patent
Ozawa et al.

(10) Patent No.: US 7,716,993 B2
(45) Date of Patent: May 18, 2010

(54) GAS FLOW RATE VERIFICATION UNIT

(75) Inventors: Yukio Ozawa, Kasugai (JP); Minoru Ito, Kasugai (JP); Hiroki Doi, Kasugai (JP); Akiko Nakada, Kasugai (JP)

(73) Assignee: CKD Corporation, Komaki-Shi (JP)

( * ) Notice: Subject to any disclaimer, the term of this patent is extended or adjusted under 35 U.S.C. 154(b) by 71 days.

(21) Appl. No.: 12/223,808

(22) PCT Filed: Feb. 22, 2007

(86) PCT No.: PCT/JP2007/053271
§ 371 (c)(1),
(2), (4) Date: Aug. 11, 2008

(87) PCT Pub. No.: WO2007/102319
PCT Pub. Date: Sep. 13, 2007

(65) Prior Publication Data
US 2009/0019943 A1 Jan. 22, 2009

(30) Foreign Application Priority Data
Mar. 7, 2006 (JP) ............................. 2006-061118

(51) Int. Cl.
*G01F 1/00* (2006.01)
*G01F 25/00* (2006.01)
*G01F 1/34* (2006.01)
(52) U.S. Cl. ..................... 73/861; 137/597; 137/12
(58) Field of Classification Search ............... None
See application file for complete search history.

(56) References Cited
U.S. PATENT DOCUMENTS
7,376,520 B2 * 5/2008 Wong et al. ............... 702/45
7,412,986 B2 * 8/2008 Tison et al. ............... 137/12
7,424,895 B2 * 9/2008 Tison et al. ............... 137/12
7,461,549 B1 * 12/2008 Ding et al. ............... 73/239

(Continued)

FOREIGN PATENT DOCUMENTS
JP A-07-306084 11/1995

(Continued)

*Primary Examiner*—Harshad Patel
(74) *Attorney, Agent, or Firm*—Oliff & Berridge, PLC

(57) ABSTRACT

A gas flow rate verification unit capable of enhancing reliability of gas flow rate verification. The gas flow rate verification unit has a first cutoff valve that is connected to a flow rate control device and to which gas is inputted, a second cutoff valve for discharging the gas, a communication member for allowing the first cutoff valve and the second cutoff valve to communicate with each other, a pressure sensor for detecting the pressure of the gas supplied between the first cutoff valve and the second cutoff valve, a temperature detector for detecting the temperature of the gas supplied between the first cutoff valve and the second cutoff valve, and a control means for verifying the flow of the gas flowing in the flow control device, the verification being performed by using both the result of the pressure detected by the pressure sensor and the result of the temperatures detected by the temperature detector. The volume (Vk) between the valve seat of the first cutoff valve and the valve seat of the second cutoff valve is equal to or less than the volume (Ve) between the outlet of the flow control device and the valve seat of the first cutoff valve.

17 Claims, 16 Drawing Sheets

U.S. PATENT DOCUMENTS

| | | | |
|---|---|---|---|
| 2006/0011237 A1* | 1/2006 | Tison et al. | 137/487.5 |
| 2006/0212233 A1* | 9/2006 | Wong et al. | 702/50 |
| 2009/0063059 A1* | 3/2009 | Nakada et al. | 702/47 |
| 2009/0112491 A1* | 4/2009 | Nakada et al. | 702/47 |
| 2009/0112504 A1* | 4/2009 | Ding et al. | 702/100 |

FOREIGN PATENT DOCUMENTS

| | | |
|---|---|---|
| JP | A-11-223538 | 8/1999 |
| JP | 3022931 B2 | 3/2000 |
| WO | WO 97/19329 A1 | 5/1997 |
| WO | WO 2005/124492 A1 | 12/2005 |

* cited by examiner

GAS FLOW RATE VERIFICATION UNIT

TECHNICAL FIELD

The present invention relates to a gas flow rate verification unit that verifies a flow rate of a flow rate control device used in a gas system in a semiconductor manufacturing process.

BACKGROUND ART

In a film deposition device or a dry etching device in a semiconductor manufacturing process, special gas such as silane or phosphine, corrosive gas such as chlorinated gas, combustible gas such as hydrogen gas, or the like are used.

Flow rates of these gases should strictly be controlled.

The reason of this is because the gas flow rate directly affects a quality of the process. Specifically, the gas flow rate greatly affects a film quality in a film deposition process or a quality of a circuit processing in an etching process, whereby a yield of a semiconductor product is determined according to precision of the gas flow rate.

Another reason is that most of these gases are harmful to a human body and environment or have explosiveness. These gases are not allowed to be directly disposed in the atmosphere after they are used, so that a device used in a semiconductor manufacturing process should be provided with detoxifying device in accordance with a type of gas. However, the detoxifying device described above has limited processing capacity in general. Therefore, when the flow rate more than the allowable value flows, it cannot perfectly process the gas, so that the deleterious gas might be flown out in the atmosphere or the detoxifying device might be broken.

Moreover, since these gases, especially high-purity dust-free gas that can be used in a semiconductor manufacturing process, are expensive, and limitation is imposed on some gases for their use due to natural deterioration, they cannot be preserved in a large quantity.

In view of this, a known mass flow controller serving as a flow rate control device has conventionally been mounted in a semiconductor manufacturing process circuit so that a gas flows in an optimum flow rate for every type of gas. The mass flow controller described above changes the set flow rate by changing the applied voltage thus responding to changes in a process recipe.

However, these gases used in the semiconductor manufacturing process, especially the material gas for the film deposition among the so-called process gases, might cause precipitation of solid substances in a gas line due to its characteristics, so that the flow volume might be changed. The mass flow controller is formed with a capillary tube inside in order to supply a fixed flow rate with high precision. Even a small amount of precipitation of the solid substance on this portion could deteriorate the flow precision of the gas to be supplied. Further, since a gas with high corrosivity for an etching process or the like is flown, the corrosion of the mass flow controller cannot be avoided even if a material having a high corrosion resistance such as a stainless material or the like is used. As a result, a secular deterioration could occur, deteriorating the flow precision.

As described above, in the mass flow controller, the relationship between the applied voltage and the actual flow rate changes, so that the actual flow rate might possibly change. Therefore, the mass flow controller needs to be periodically subject to flow rate verification calibration.

The flow rate verification of the mass flow controller is basically performed by using a film flowmeter. However, this measurement is performed with a part of a pipe removed. After the measurement, the pipe should be assembled in the original state, and a leakage check should be executed. Therefore, the work is very time-consuming. Accordingly, it is ideal that the flow rate verification can be executed without removing the pipe.

As a method for performing the flow rate verification with the pipe assembled, there has been a method, as disclosed in Patent Document 1, in which a gas flow rate verification unit U is mounted downstream of a mass flow controller so as to constitute a gas mass flow measurement system. FIG. 19 shows a block diagram of a gas mass flow verification system.

As shown in FIG. 19, the gas mass flow verification system includes the gas flow rate verification unit U that includes a valve component 151, a chamber 153, a transducer assembly 154, and a valve component 152 and is mounted downstream of a mass flow controller 10. The chamber 153 has a known volume. The transducer assembly 154 is connected to a gas flow line 150 downstream of the chamber 153, and the valve components 151 and 152 are connected to the gas flow line 150 positioned downstream and upstream of the transducer assembly 154, thereby making the volume constant. The transducer assembly 154 outputs a signal directly indicating a PV/RT on the basis of pressure and temperature between the valve components 151 and 152. Here, P denotes a pressure, V denotes a volume, R denotes a gas constant, and T denotes an absolute temperature.

The gas mass flow verification system described above measures the actual flow rate of the mass flow controller 10 on the basis of the signal indicating the PV/RT outputted from the transducer assembly 154 without individually measuring pressure and temperature of the chamber 153. The gas mass flow verification system compares the actual flow rate with the preset flow rate of the mass flow controller 10, thereby verifying the flow rate of the mass flow controller 10.

Patent Document 1: Japan Patent No. 3022931

DISCLOSURE OF INVENTION

Problems to be Solved by the Invention

However, when the inventors conducted an evaluation test with the conventional gas flow rate verification unit U, it is confirmed that the conventional unit U has wide variations in the verification precision regarding flow rate control of the mass flow controller 10, having less reliability as shown in FIG. 10 (*iii*).

Specifically, the inventors conducted the evaluation test by measuring the flow rate of the mass flow controller 10 with a high flow precision flowmeter and comparing the measured value with the flow rate measured by the conventional flow rate verification unit U. As shown in FIG. 10(*iii*), in a case that the flow rate of $N_2$ gas to be supplied to the mass flow controller 10 is 100 sccm in the conventional unit U, an error between the flow rate calculated by the conventional unit U and the flow rate controlled by the mass flow controller 10 is 0.012%. On the other hand, in a case where 500 sccm of $N_2$ gas is supplied to the mass flow controller 10, the error between the flow rate calculated by the conventional unit U and the actual flow rate supplied to the mass flow controller is 1.150%. Consequently, as the flow rate increases in the conventional unit U, the error of the flow rate measured by the conventional unit U becomes larger, resulting in less reliability.

In this way, if the verification precision of the gas flow rate verification unit U varies depending upon the flow rate controlled by the mass flow controller 10, there is a possibility that the gas flow rate verification unit U measures 500 sccm and recognize in error that the flow rate of the mass flow controller 10 is accurate even though the mass flow controller 10 does not control the gas flow rate as the preset flow rate (500 sccm) when the mass flow controller 10 is applied a voltage for controlling a large flow rate (500 sccm). Moreover, there is a possibility that the flow rate verification unit U fails to measure the flow rate of 500 sccm and performs an unnecessary calibration to the mass flow controller 10 even though the mass flow controller 10 precisely controls the gas flow to the preset flow rate (500 sccm). Such a defect directly affects the yield in the semiconductor manufacturing process or the like and is very problematic.

The present invention has been made in view of the above circumstances and has an object to overcome the above problems and provide a gas flow rate verification unit capable of enhancing reliability of the flow rate verification.

Means for Solving the Problems

A gas flow rate verification unit according to the present invention is provided with the following configuration.

(1) A gas flow rate verification unit mounted downstream of a flow control device comprises a first cutoff valve that is connected to the flow rate control device for inputting a gas, a second cutoff valve for outputting the gas, a communication member communicating the first and second cutoff valves with each other, a pressure detector detecting a pressure of the gas supplied between the first and second cutoff valves, a temperature detector detecting a temperature of the gas supplied between the first and second cutoff valves, and a control device verifying a flow rate of the gas flowing through the flow rate control device by using a result of the pressure detected by the pressure detector and a result of the temperature detected by the temperature detector, and a volume from the first cutoff valve to the second cutoff valve is not more than a volume from an outlet of the flow rate control device to the first cutoff valve.

(2) In the present invention according to (1), preferably, the communication member is a channel block in which a first port communicating with an output of the first cutoff valve, a second port communicating with an input port of the second cutoff valve, and a third port communicating with the pressure detector are open at a same side face, and an internal channel that communicates the first port, the second port, and the third port with one another is formed.

(3) In the present invention according to (2), preferably, the temperature detector is a bar-like temperature sensor, and the channel block has a mounting portion in which the temperature sensor is mounted.

(4) In the present invention according to any one of (1) to (3), preferably, the gas flow rate verification unit is housed in a gas box including a gas unit in which the flow rate control device is mounted.

(5) In the present invention according to any one of (1) to (4), preferably, the control device includes a volume measuring device for measuring a volume from the flow rate control device to the first cutoff valve by calculating an increasing pressure value per a unit time from the time when the pressure detector detects a fixed initial pressure to the time when the pressure detector detects a target pressure when the gas is filled between the flow rate control device and the second cutoff valve by the target pressure, detecting the temperature of the gas upon the pressure detection by the temperature detector, measuring a volume of the gas in a tank (tank volume) from the flow rate control device to the second cutoff valve by use of the pressure increase value and the gas temperature, and subtracting the volume from the first cutoff valve to the second cutoff valve from the tank volume.

(6) In the present invention according to any one of (1) to (4), preferably, the second cutoff valve is connected to a vacuum pump, and the control device includes a volume measuring device for measuring the volume from the flow rate control device to the first cutoff valve by measuring the tank volume from the flow rate control device to the second cutoff valve by use of a pressure change and a temperature change between the first and second cutoff valves when a portion between the first and second cutoff valves is evacuated by the vacuum pump and then the gas filled between the flow rate control device and the first cutoff valve is discharged between the first and second cutoff valves and by subtracting the volume from the first cutoff valve to the second cutoff valve from the tank volume.

(7) In the present invention according to any one of (1) to (4), preferably, the control device samples pressure values detected by the pressure detector at a predetermined interval to calculate a gradient between a newly sampled pressure value and a sampled pressure value prior to the newly sampled pressure value and verifies a flow rate of the gas when the calculated gradient becomes within a measurable range.

(8) In the present invention according to any one of (1) to (4), preferably, the control device samples the pressure values detected by the pressure detector at a predetermined interval to calculate a correlation coefficient with respect to the gradient of the newly sampled pressure value and verifies the flow rate of the gas when the calculated correlation coefficient becomes within a measurable range.

Advantages of the Invention

In the gas flow rate verification unit of the present invention which has the above-mentioned configuration, the volume from the first cutoff valve to the second cutoff valve is not more than the volume from the outlet of the flow rate control device to the first cutoff valve, so that the pressure between the first and second cutoff valves is likely to be uniform even if the gas flow rate supplied from the flow rate control device to the portion between the first and second cutoff valves is changed. Therefore, the flow rate verification unit of the present invention can correctly detect the pressure and the temperature between the first and second cutoff valves by the pressure detector and the temperature detector and verify the gas flow rate by use of the results of the pressure detection and the temperature detection. Consequently, according to the gas flow rate verification unit of the present invention, an error of the measured flow rate with respect to changes in the controlled flow rate is reduced, so that reliability of the flow rate verification can be enhanced.

In the gas flow rate verification unit of the present invention which has the above-mentioned configuration, the first cutoff valve, the second cutoff valve, and the pressure detector are mounted in the channel block to be integrated in a manner that an output port of the first cutoff valve is communicated with a first port of the channel block, an input port of the second cutoff valve is communicated with a second port of the channel block, and the pressure detector is communicated with a third port of the channel block. Thereby, the volume between the first and second cutoff valves can be reduced to downsize the gas flow rate verification unit. Further, by reducing the volume between the first and second cutoff valves is reduced, time taken for the pressure between the first and second cutoff valves to reach the target pressure can be shortened, thereby shortening the verification time of the gas flow rate.

In the gas flow rate verification unit of the present invention, a bar-like temperature sensor is mounted in a mounting portion of the channel block to measure the temperature of the channel block, thereby detecting the temperature of the gas supplied between the first and second cutoff valves. Therefore, the temperature sensor can be mounted in the gas flow rate verification unit with the volume between the first second cutoff valves being reduced.

In the flow rate verification unit of the present invention with the above-mentioned configuration, the gas flow rate verification unit is housed in a gas box including a gas unit in which the flow rate control device is mounted, so that there is no need to change a structure or an external pipe of the gas box for arranging an installation space for the gas flow rate verification unit. Accordingly, the gas flow rate verification unit of the present invention can provide an excellent installation property.

In the flow rate verification unit of the present invention with the above-mentioned configuration, the control device includes a volume measuring device. The volume measuring device calculates an increasing pressure value per a unit time from the time when the pressure detector detects a fixed initial pressure to the time when the pressure detector detects a target pressure when the gas is filled between the flow rate control device and the second cutoff valve by the target pressure. Concurrently, in the volume measuring device, a gas temperature during the pressure detection is detected by the temperature detector. Then, after measuring a tank volume from the flow rate control device to the second cutoff valve by use of the pressure increase value and the gas temperature, the volume from the first cutoff valve to the second cutoff valve is subtracted from the tank volume to measure the volume from the flow rate control device to the first cutoff valve. Consequently, in the gas flow rate verification unit of the present invention, even if the volume from the outlet of the flow rate control device to the first cutoff valve varies depending upon a system structure in which the unit is mounted, the influence caused by the variation is eliminated, thereby precision in the gas flow rate verification unit can be kept satisfactory.

In the flow rate verification unit of the present invention with the above-mentioned configuration, the second cutoff valve is connected to a vacuum pump, and the control device is connected to the pressure sensor that detects the pressure between the outlet of the flow rate control device and the first cutoff valve. The control device includes the volume measuring device. In the volume measuring device, when the portion between the first cutoff valve and the second cutoff valve is evacuated by the vacuum pump, and then the gas filled between the flow rate control device and the first cutoff vale is discharged between the first and second cutoff valves, the tank volume from the flow rate control device to the second cutoff valve is measured by use of the pressure change and the temperature change between the first and second cutoff valves to subtract the volume from the first cutoff valve to the second cutoff valve from the tank volume, thus measuring the volume from the flow rate control device to the first cutoff valve. Consequently, according to the gas flow rate verification unit of the present invention, even if the volume from the flow rate control device to the first cutoff valve varies depending upon the system structure in which the unit is mounted, the influence caused by the variation is eliminated, so that the precision in the gas flow rate verification can be kept satisfactory.

In the flow rate verification unit of the present invention with the above-mentioned configuration, a gradient of the pressure value detected by the pressure detector or correlation coefficient with respect to the gradient of the pressure value are calculated, and the flow rate of the gas is verified when the calculated gradient or the correlation coefficient become within a measurable range. Therefore, the flow rate verification can be performed without waiting a dead time for stabilizing the pressure detector to detect a measurement start pressure, and accordingly the flow rate verification time can be shortened.

Figure 10:
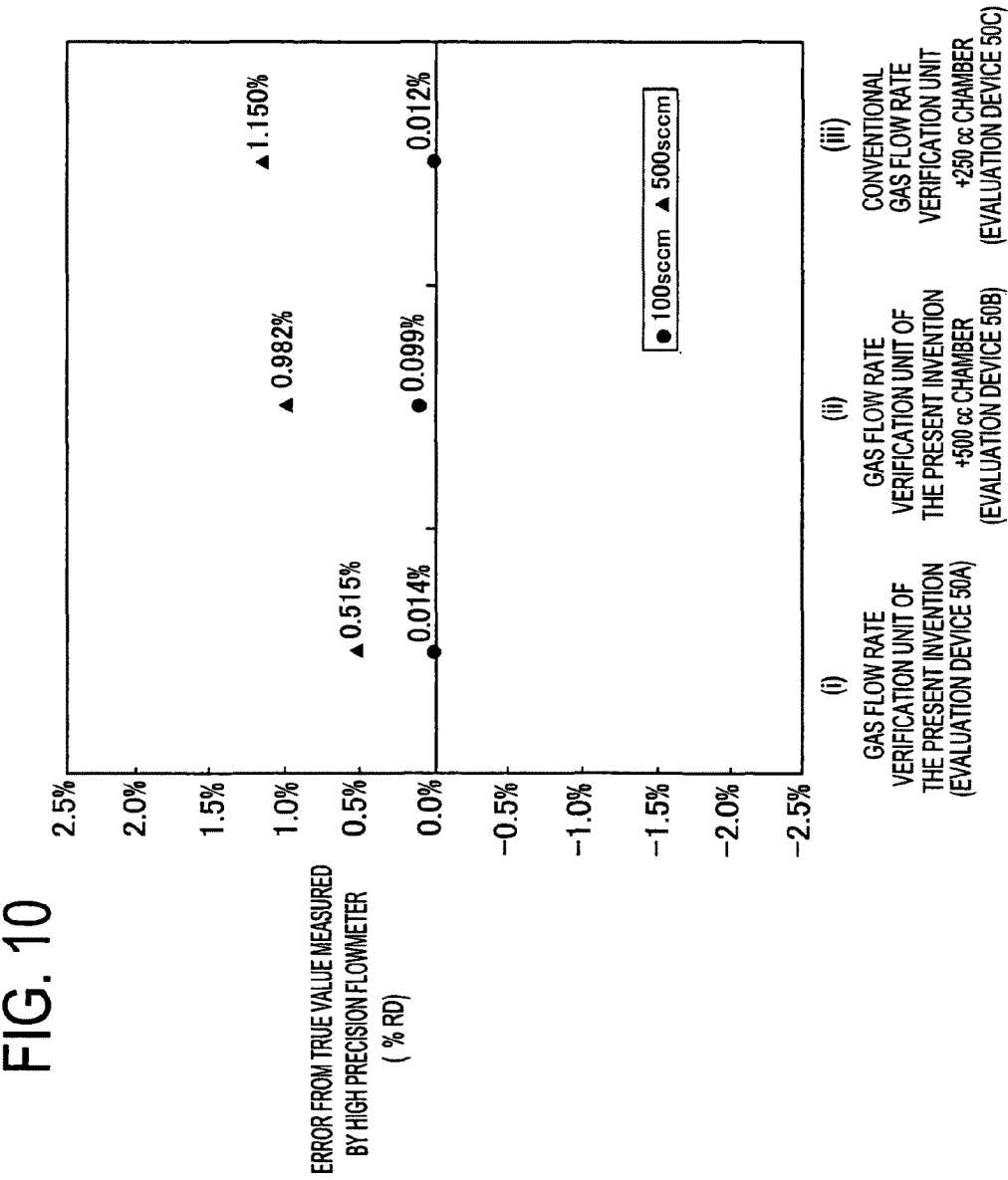
Figure 11:
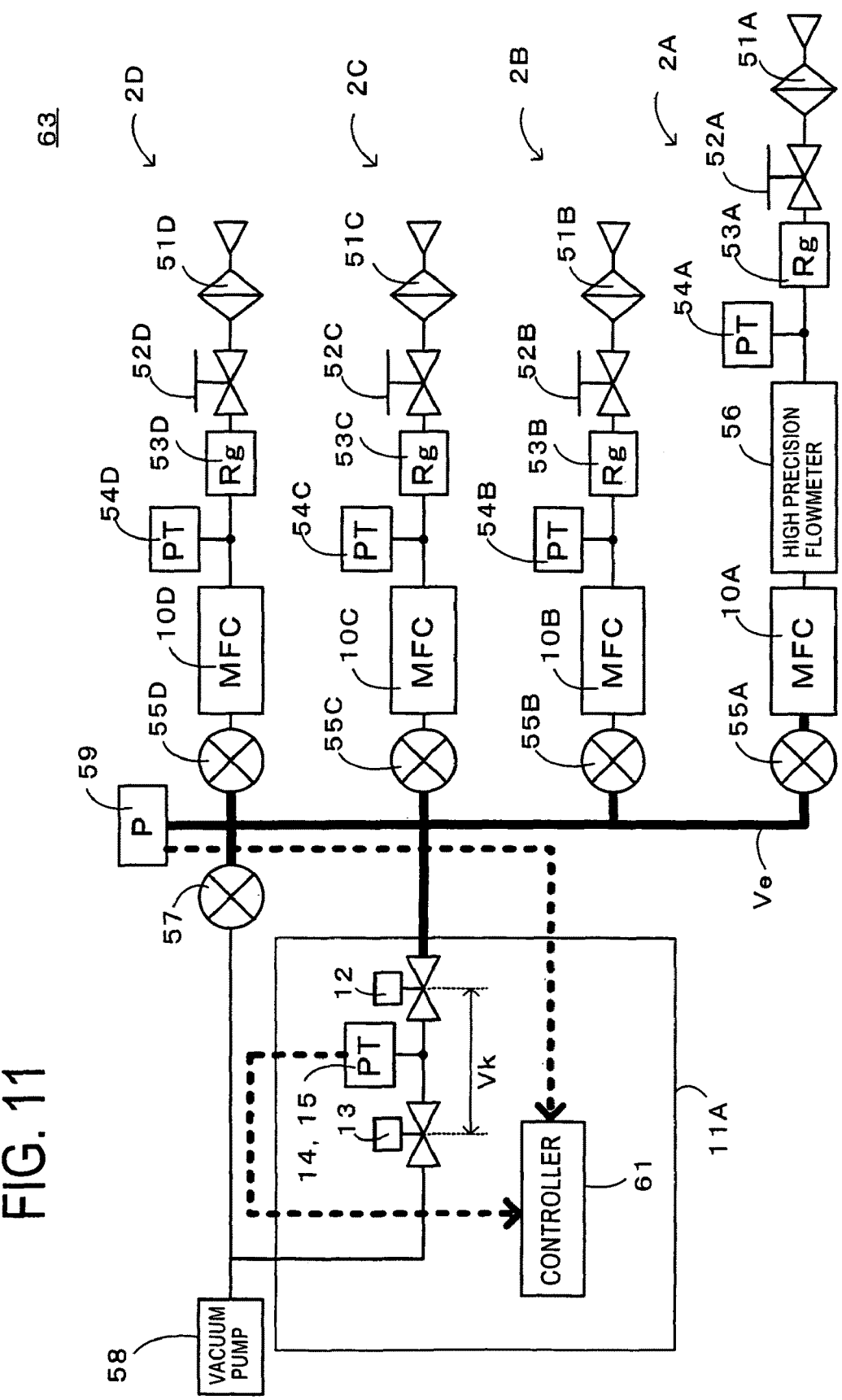
Figure 12:
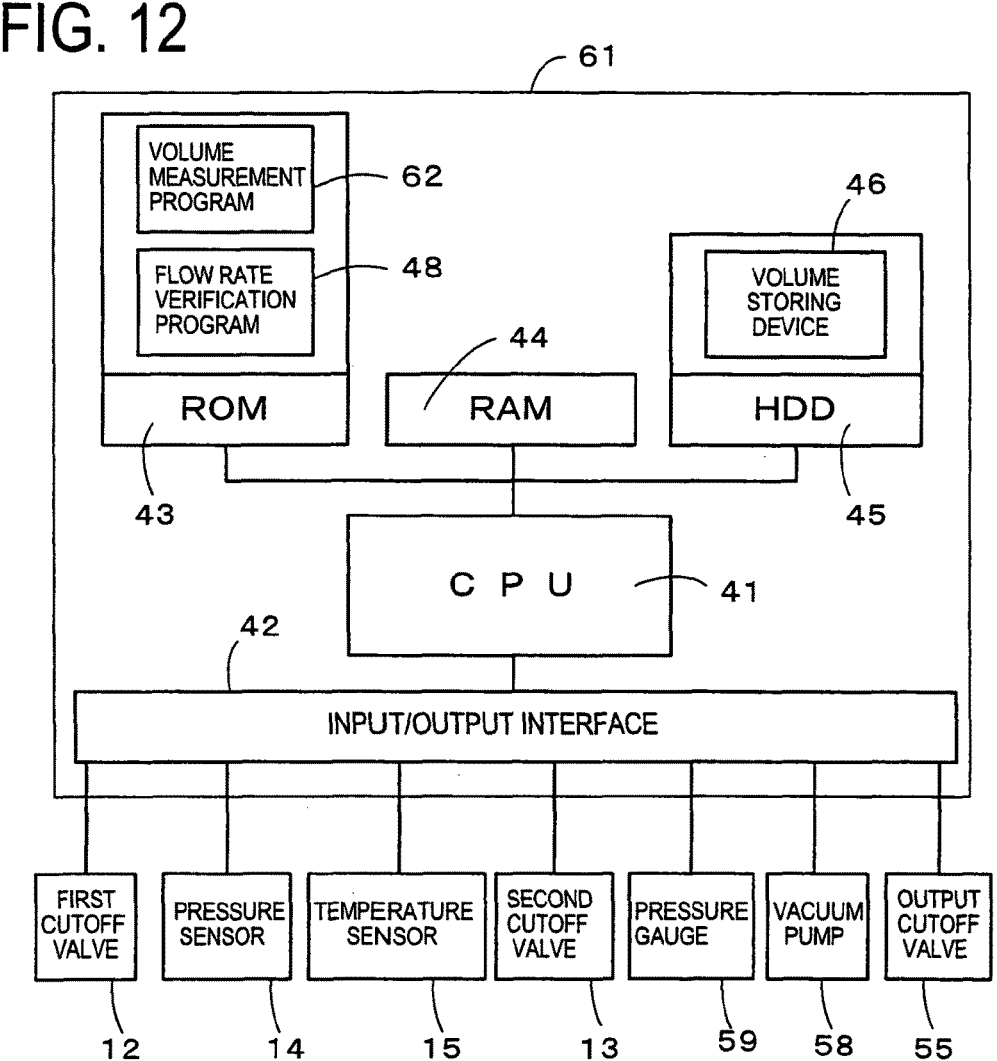
Figure 13:
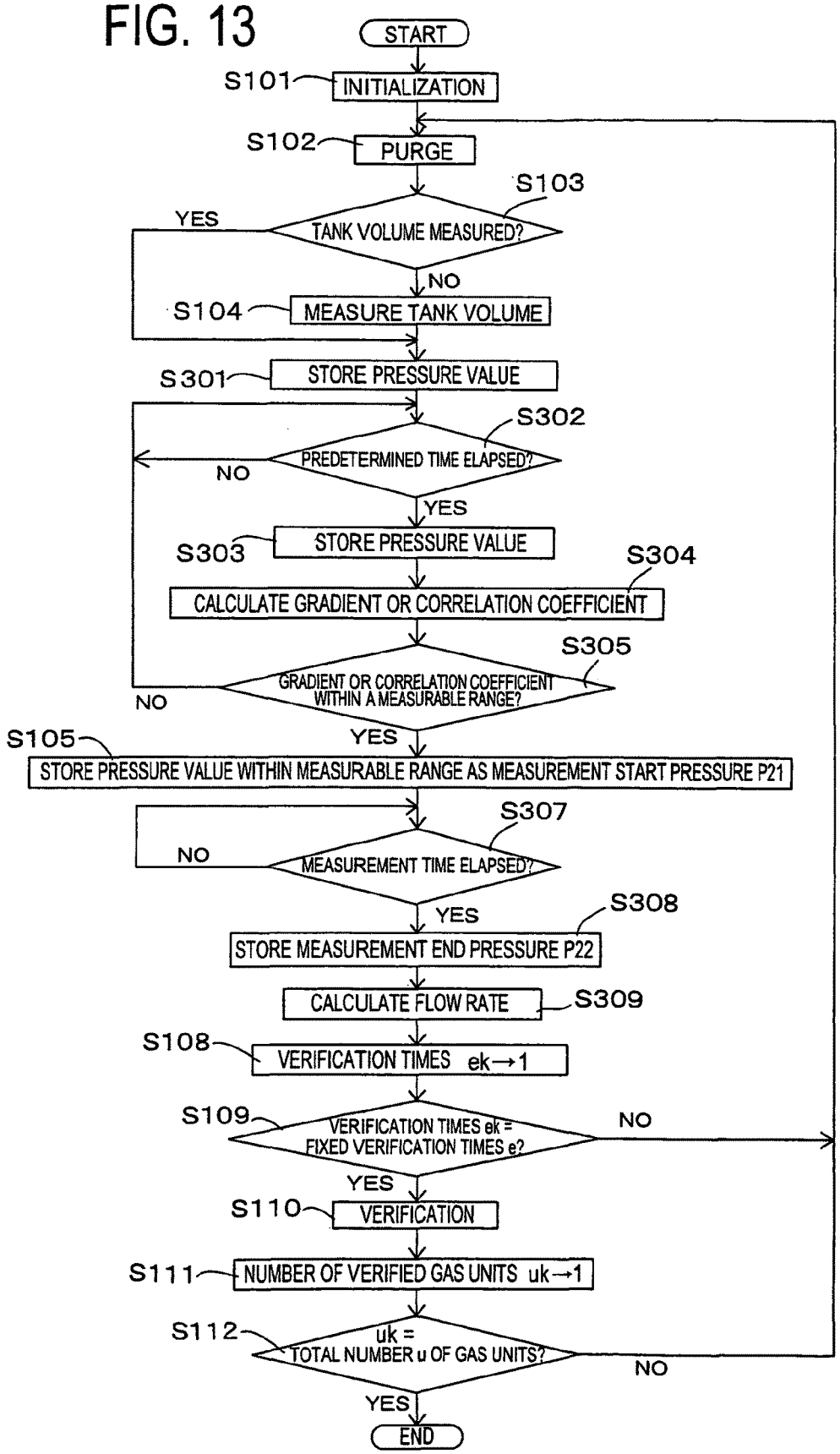
Figure 14:
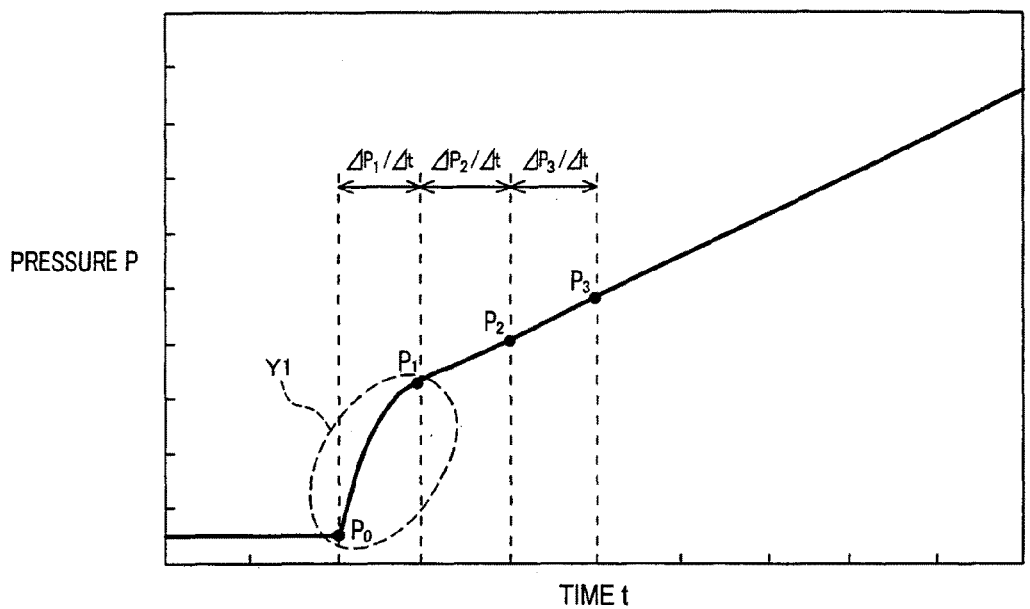
Figure 15:
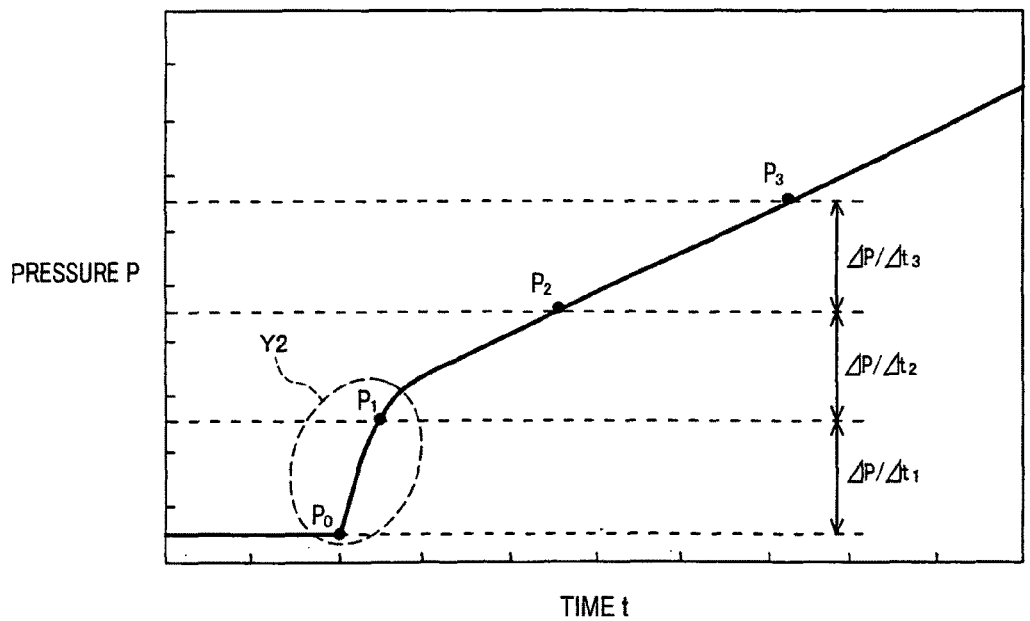
Figure 16:
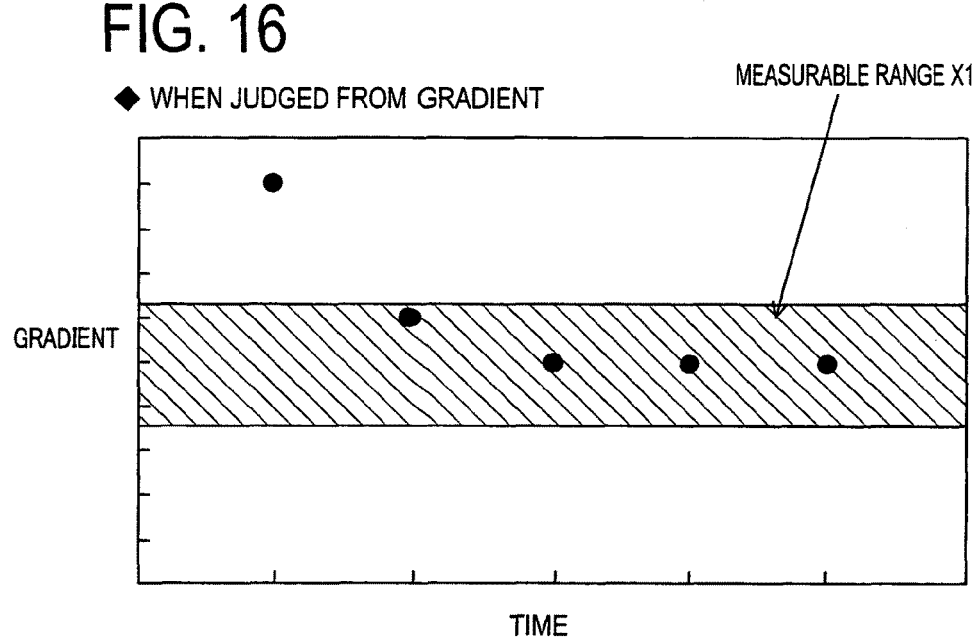
Figure 17:
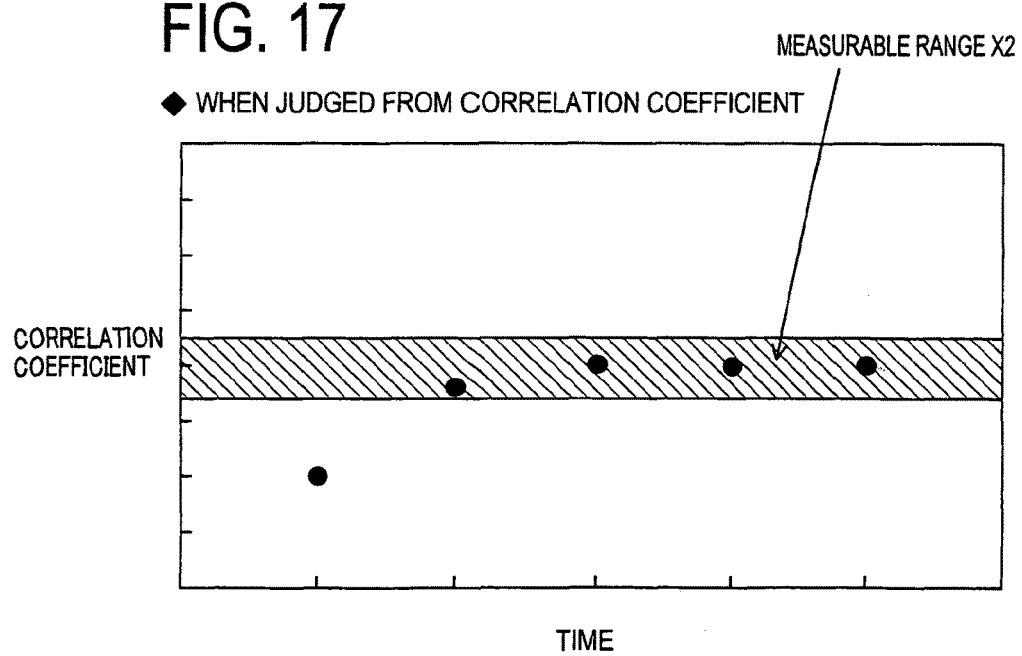
Figure 18:
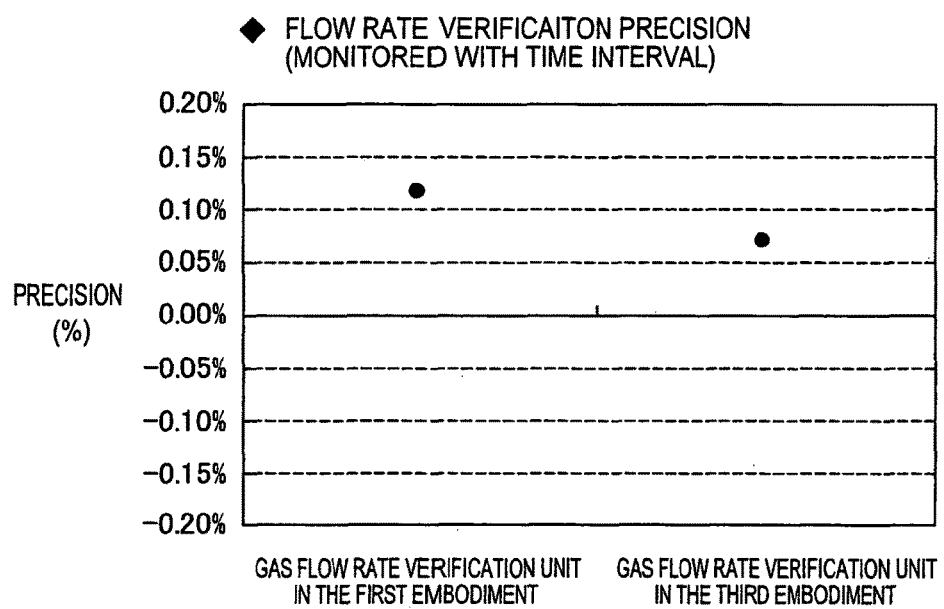
Figure 19:
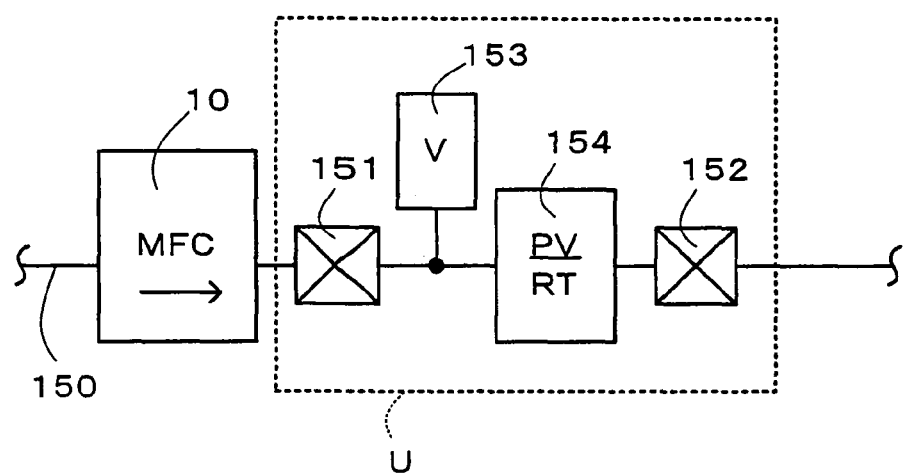

FIG. 10 is a graph showing errors between a flow rate calculated by a gas flow rate verification system and a flow rate measured by a high precision flowmeter in each of three evaluation devices wherein black dots indicate errors in a case of the flow rate 100 sccm while black triangles indicate errors in a case of the flow rate 500 sccm, and each evaluation test is conducted under the same condition (5-13 kPa);

FIG. 11 is a block diagram showing one example of a gas supply integration unit provided with a gas flow rate verification unit according to a second embodiment of the present invention;

FIG. 12 is an electric block diagram of a controller shown in FIG. 11;

FIG. 13 is a flowchart showing a gas flow rate verification method executed by a gas flow rate verification unit according to the third embodiment;

FIG. 14 is a graph showing a data obtained by sampling pressure values detected by a pressure sensor at an interval of a predetermined time in the gas flow rate verification unit according to the third embodiment of the present invention;

FIG. 15 is a graph showing a data obtained by sampling the pressure values detected by the pressure sensor at an interval of a predetermined pressure in the gas flow rate verification unit according to the third embodiment of the present invention;

FIG. 16 is a view showing a relation between a gradient of the data shown in FIG. 14 or FIG. 15 and a measurable range;

FIG. 17 is a view showing a relation between correlation coefficient of the data shown in FIG. 14 or FIG. 15 and a measurable range;

FIG. 18 is a view showing a result of an experiment for flow rate verification precision of the gas flow rate verification units in the first and third embodiments; and FIG. 19 is a block diagram of a conventional flow rate control device absolute flow rate check system.

EXPLANATION FOR REFERENCE CODES

1 Gas box
2 Gas unit
10 Mass flow controller (flow rate control device)

11 Gas flow rate verification unit
12 First cutoff valve
13 Second cutoff valve
14 Pressure sensor (pressure detector)
15 Temperature sensor (temperature detector)
16 Controller (control device)
18 Channel block (communication member)
21 Second port (output port)
26 First port (input port)
47 Volume measurement program (volume measuring device)
58 Vacuum pump
62 Volume measurement program (volume measuring device)

BEST MODES FOR CARRYING OUT THE INVENTION

Embodiments of a gas flow rate verification unit according to the present invention will be explained below with reference to the accompanying drawings.

First Embodiment

Figure 1:
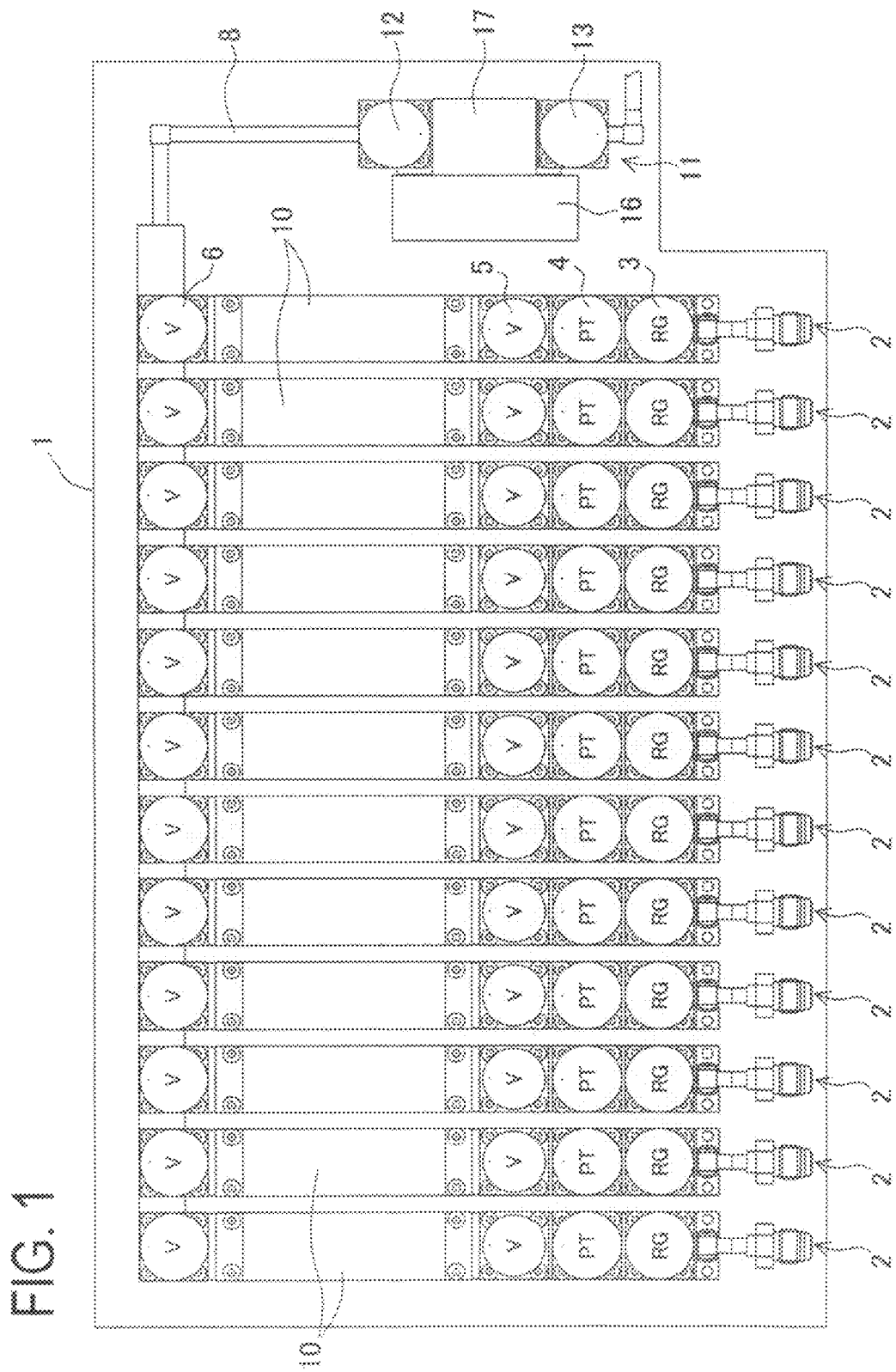
FIG. 1 is a schematic structural view of a gas box having a gas flow rate verification unit incorporated therein according to a first embodiment of the present invention.
Figure 2:
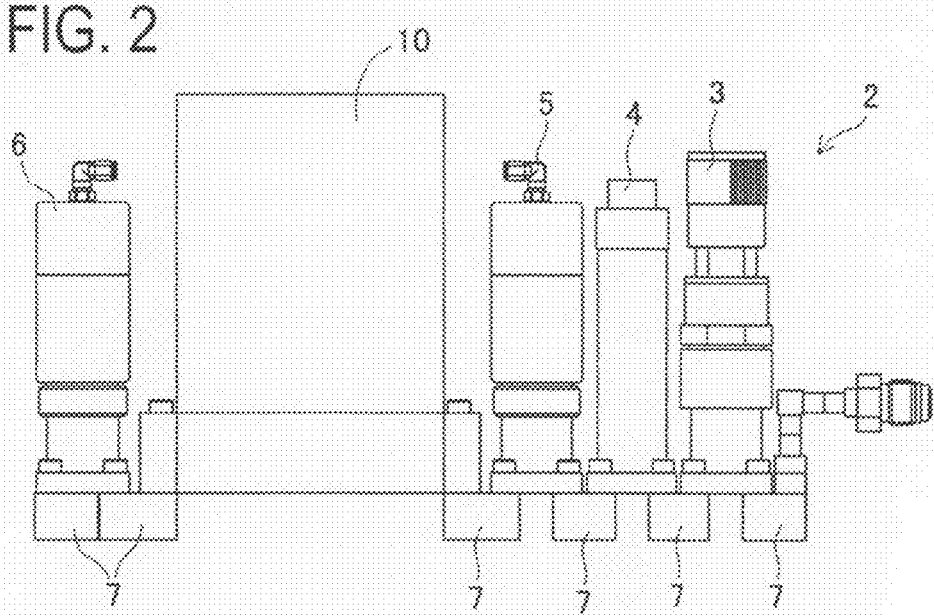
FIG. 2 is a side view of a gas unit shown in FIG. 1.

FIG. 1 is a schematic structural view of a gas box 1 having a gas flow rate verification unit 11 incorporated therein. FIG. 2 is a side view of a gas unit 2 shown in FIG. 1.

As shown in FIG. 1, the gas flow rate verification unit 11 is mounted in the gas box 1, for example. The gas box 1 has a box-like shape and a gas supply integration unit having plural (twelve in FIG. 1) gas units 2 integrated therein. As shown in FIGS. 1 and 2, each of the gas units 2 includes a fluid control device such as a regulator 3, a pressure gauge 4, an input cutoff valve 5, a mass flow controller 10 which is one example of a "flow rate control device", an output cutoff valve 6, and the like each being fixed on an upper surface of a channel block 7 and integrally coupled in series.

As shown in FIG. 1, an installation space for installing a pipe 8 for charging a process gas from each gas unit 2 is provided between the gas units 2 and the gas box 1. In the installation space, the surrounding of the pipe 8 is a dead space. The gas box 1 is configured such that the gas flow rate verification unit 11 is fixed to the dead space with a volt or the like. The gas flow rate verification unit 11 communicates with the mass flow controller 10 of each gas unit 2 to verify the flow rate of the mass flow controller 10. The components of the gas flow rate verification unit 11 are made into a unit, thereby the gas flow rate verification unit 11 can be integrally attached to or detached from the gas box 1.

<Structure of Gas Flow Rate Verification Unit>

Figure 3:
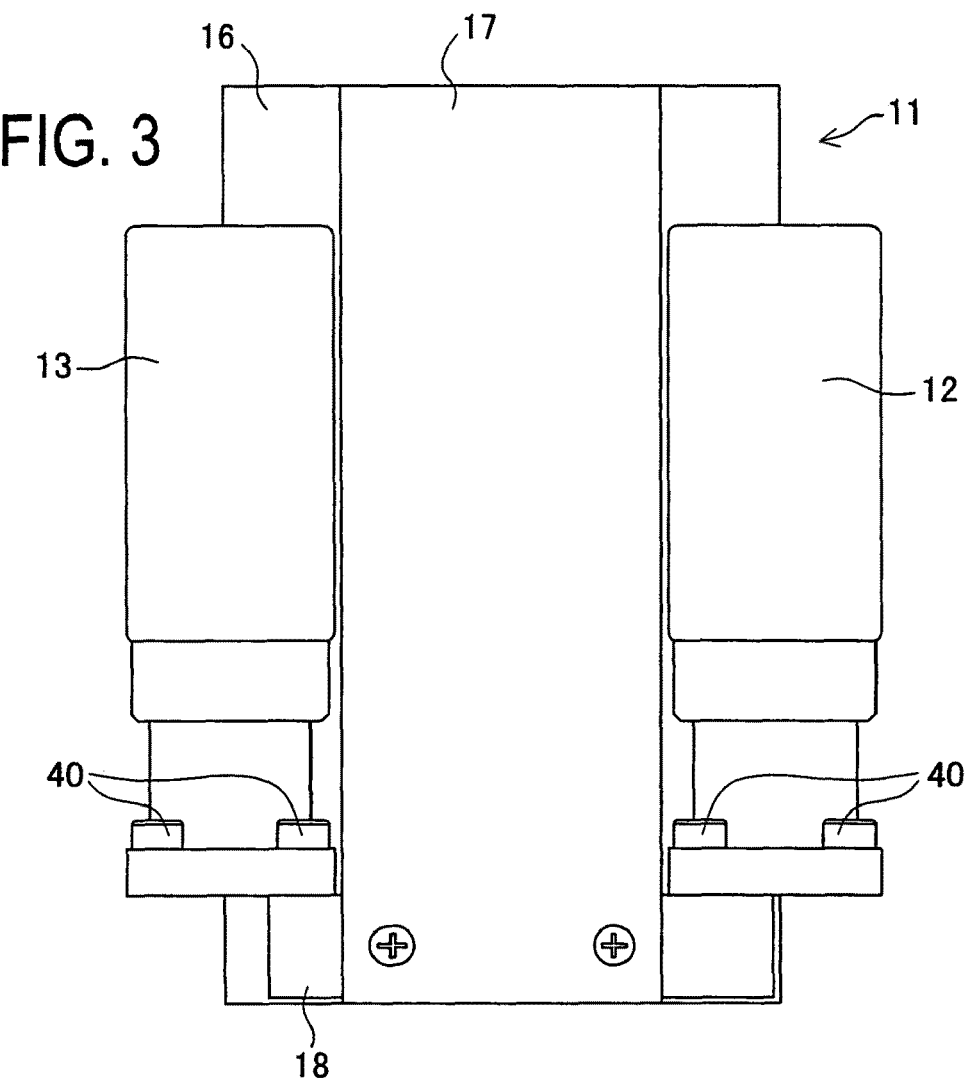
FIG. 3 is a side view of the gas flow rate verification unit shown in FIG. 1.
Figure 4:
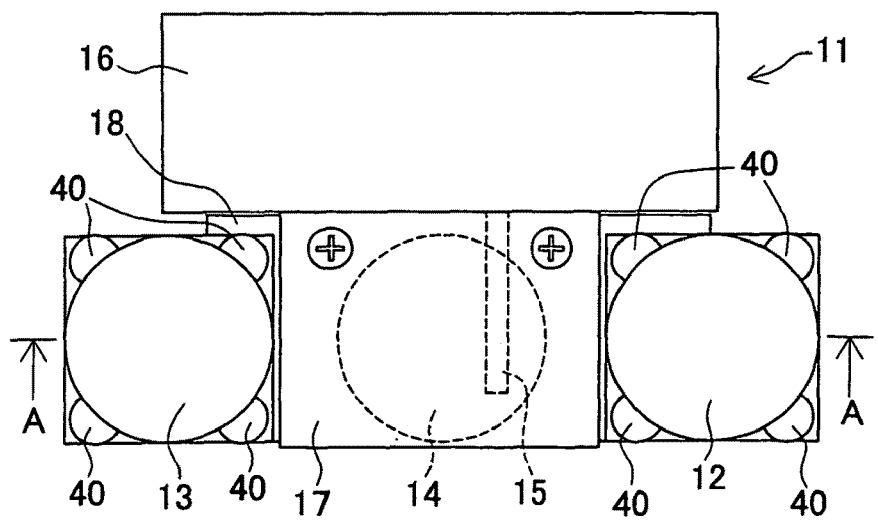
FIG. 4 is a top view of the gas flow rate verification unit shown in FIG. 1.

FIG. 3 is a side view of the gas flow rate verification unit 11 shown in FIG. 1. FIG. 4 is a top view of the gas flow rate verification unit 11 shown in FIG. 1.

As shown in FIGS. 3 and 4, the gas flow rate verification unit 11 includes a first cutoff valve 12, a second cutoff valve 13, a pressure sensor 14 as a "pressure detector", a temperature sensor 15 that is a "temperature detector", a controller 16 as "a control device", and others. In the gas flow rate verification unit 11, a sensor cover 17 is screwed to cover the pressure sensor 14 so as to prevent changes in the setting by the user's touch to the pressure sensor 14 at a time of installation of the unit.

Figure 5:
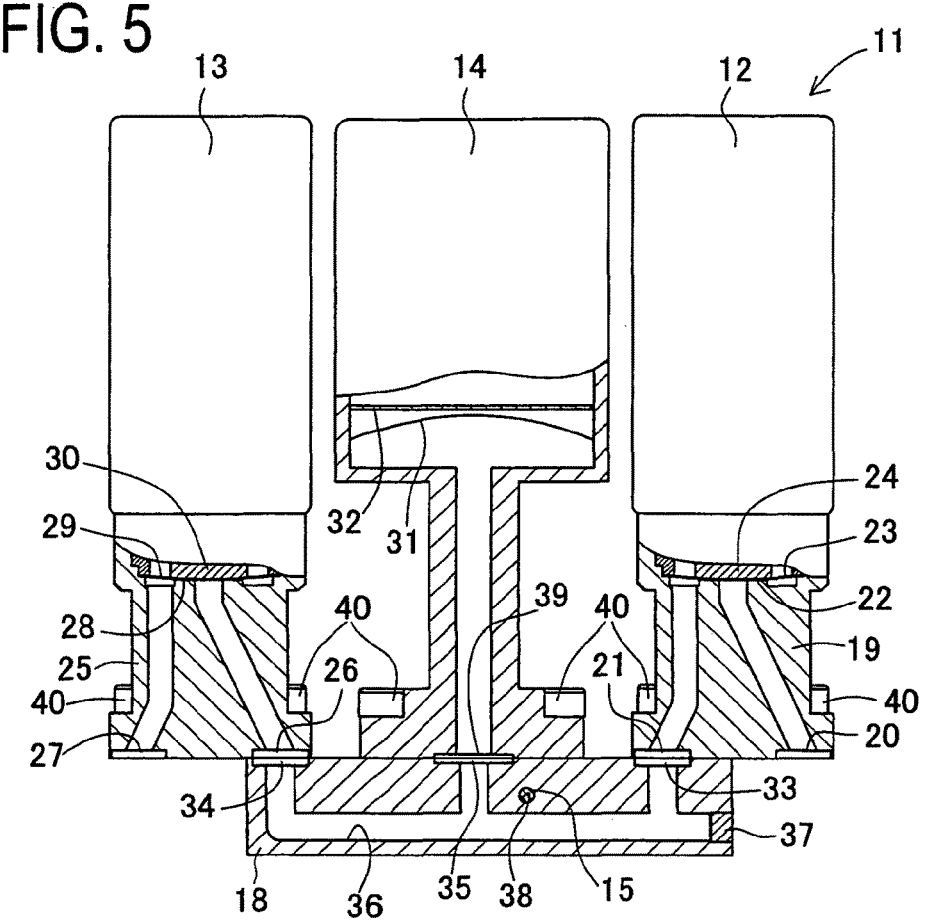
FIG. 5 is a sectional view of the gas flow rate verification unit taken along a line A-A in FIG. 4.

FIG. 5 is a sectional view of the gas flow rate verification unit 11 taken along a line A-A in FIG. 4. It is to be noted that FIG. 5 is a sectional view only illustrating the main components. A controller 16 should be illustrated in FIG. 5, but the controller 16 is omitted since FIG. 5 is used for explaining the structure of the channel.

The first cutoff valve 12, the pressure sensor 14 and the second cutoff valve 13 are fixed by bolts 40 on a top surface of the channel block 18, serving as a "communicating member." The temperature sensor 15 is mounted in the channel block 18.

The first cutoff valve 12 and the second cutoff valve 13 are electromagnetic valves having the same structure. The outer configuration of the first and second cutoff valves 12 and 13 are made such that driving portions 24 and 30 are coupled to metallic bodies 19 and 25. First ports 20 and 26 as "input ports" and second ports 21 and 27 as "output ports" are provided respectively with the bodies 19 and 25, in which valve seats 22 and 28 are further provided to communicate the first ports 20 and 26 with the second ports 21 and 27 respectively. Diaphragms 23 and 29 are displaceably mounted between the bodies 19 and 25 and the driving portions 24 and 30. The Cv values of the first and second cutoff valves 12 and 13 are desirably not less than 0.09 in order to reduce the influence to the gas flow. In the first embodiment, the Cv values of the first and second cutoff valves 12 and 13 are set to 0.10.

The pressure sensor 14 is a capacitance manometer. The pressure sensor 14 holds a metallic diaphragm 31, which is formed thin to have a thickness of about 0.1 mm to be displaced according to the gas pressure inputted to a detection port 39. A metal substrate 32 is fixed to a back-pressure side of the diaphragm 31. A conductive electrode is wired on the metal substrate 32. The metal substrate 32 is arranged with a predetermined space between the metal substrate 32 and the diaphragm 31. In the pressure sensor 14 described above, when a pressure receiving surface of the diaphragm 31 receives a gas pressure and displaces, the space between the metal substrate 32 and the diaphragm 31 is changed to change capacitance of the metal substrate 32. Consequently, the change in the capacitance is detected as a change in the gas pressure.

The temperature sensor 15 is a bar-like thermoelement.

The channel block 18 is formed of a metal such as a stainless shaping into a rectangular parallelpiped. The upper surface of the channel block 18 in the figure is formed with a first port 33, a second port 34, and a third port 35. A main channel 36 is formed in the channel block 18 passing through from the right side in the figure. In the channel block 18, an "internal channel" is formed by communicating the first port 33, the second port 34, and the third port 35 with the main channel 36. A stopcock 37 is welded to the main channel 36 to assure air tightness of the channel. The internal channel of the channel block 18 is formed to make its sectional area substantially same as those of a channel communicating with the second port 21 of the first cutoff valve 12 and with the first port 26 of the second cutoff valve 13. This is for allowing the pressure of the gas supplied to the gas flow rate verification unit 11 to be easily uniform in the channel block 18. In the first embodiment, the section of the internal channel (the main channel 36, or the like) is set to have a diameter of 4 mm. Further, an insertion hole 38, which is one example of a "mounting portion", is drilled at the outside of the main channel 36 in the direction orthogonal to the main channel 36 from the side face.

The second port 21 of the body 19 in the first cutoff valve 12 is connected to the first port 33 of the channel block 18 through an unillustrated gasket, and the first cutoff valve 12 is screwed from above in the figure with a volt 40, thereby the first cutoff valve 12 is fixed to the top surface of the channel block 18 in the figure as the unillustrated gasket being crushed.

The first port 26 of the body 25 in the second cutoff valve 13 is connected to the second port 34 of the channel block 18 through an unillustrated gasket, and the second cutoff valve 13 is screwed from above in the figure with the volt 40, thereby the second cutoff valve 13 is fixed to the top surface of the channel block 18 in the figure as the unillustrated gasket being crushed.

The detection port 39 of the pressure sensor 14 is connected to the third port 35 of the channel block 18 through an unillustrated gasket, and the pressure sensor 14 is screwed from above in the figure with the volt 40, thereby the pressure sensor 14 is fixed to the top surface of the channel block 18 in the figure as the unillustrated gasket being crushed.

The temperature sensor 15 is inserted into the insertion hole 38 to be mounted in the channel block 18.

Thus, in the gas flow rate verification unit 11, the first cutoff valve 12, the second cutoff valve 13, the pressure sensor 14, and the temperature sensor 15 are integrally mounted in one channel block 18, as shown in FIG. 5. The controller 16 of the gas flow rate verification unit 11 described above is fixed to the side face of the channel block 18 as shown in FIGS. 3 and 4.

<Electric Structure of Control Device>

Figure 6:
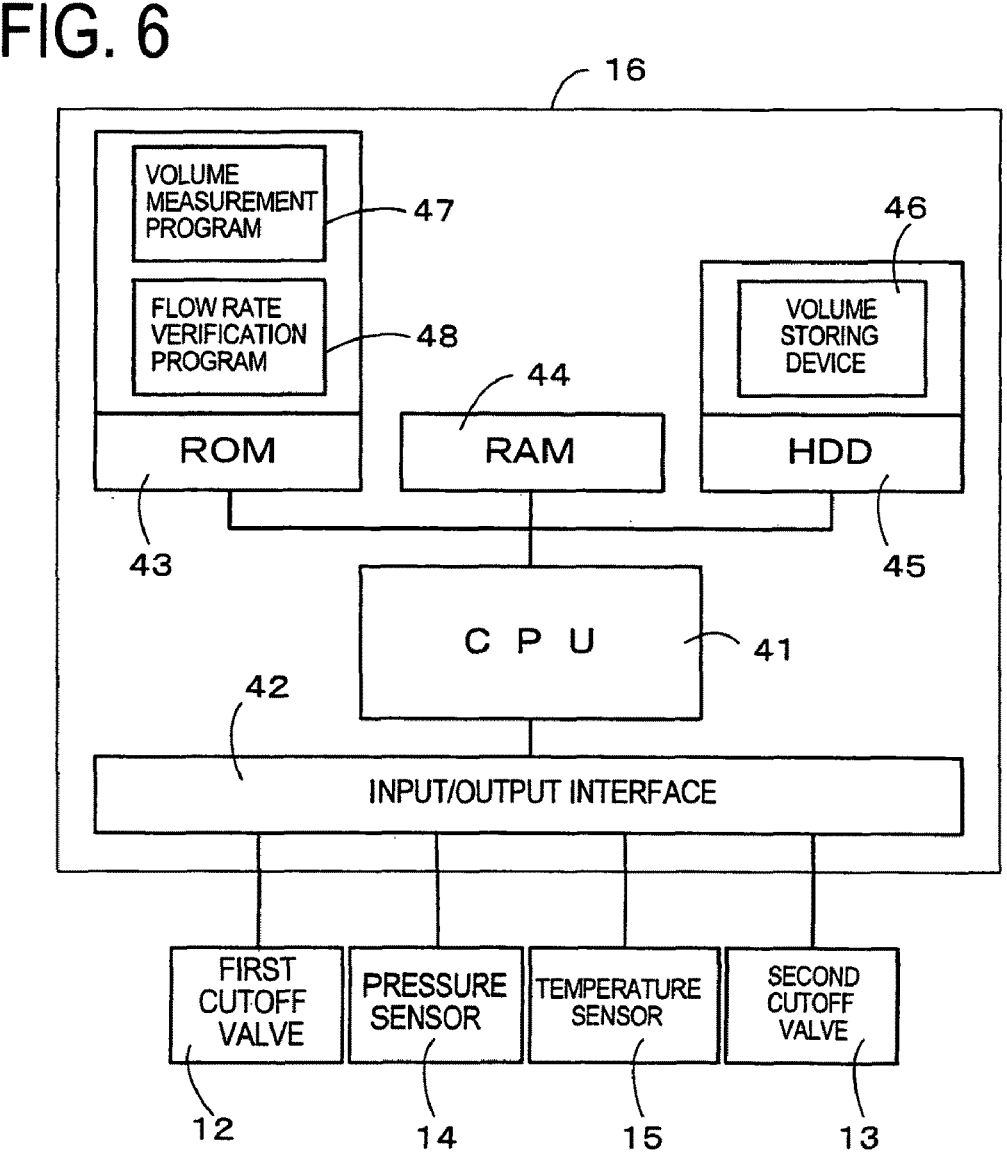
FIG. 6 is an electric block diagram of a controller shown in FIG. 1.

FIG. 6 is an electric block diagram of the controller 16.

The controller 16 has a computer function including a CPU 41, an input/output interface 42, a ROM 43, a RAM 44, and a hard disk drive (hereinafter referred to as "HDD") 45.

The input/output interface 42 is connected to the first cutoff valve 12, the second cutoff valve 13, the pressure sensor 14, and the temperature sensor 15 to receive and send signals.

Volume storing device 46 is provided in the HDD 45. In the volume storing device 46, a known volume Vk, a system channel volume Ve, and a (volume of the gas in a tank) tank volume V are stored. The "known volume Vk" means the volume between the first cutoff valve 12 and the second cutoff valve 13, more specifically, the volume in the sealed space formed between the valve seat 22 of the first cutoff valve 12 and the valve seat 28 of the second cutoff valve 13 when the first and second cutoff valves 12 and 13 are closed. The "system channel volume Ve" means the volume from the outlet of the mass flow controller 10 to the first cutoff valve 12, more specifically, the volume from the outlet of the mass flow controller 10 to the valve seat 22 of the first cutoff valve 12 when the first cutoff valve 12 is closed. The "tank volume V" means the volume from the outlet of the mass flow controller 10 to the valve seat 28 of the second cutoff valve 13 when the first cutoff valve 12 is opened and the second cutoff valve 13 is closed. The known volume Vk is measurable upon the manufacture of the gas flow rate verification unit 11, so it is stored beforehand in the volume storing device 46 after the gas flow rate verification unit 11 is manufactured and before the gas flow rate verification unit 11 is mounted in an external system. On the other hand, the system channel volume Ve and the tank volume V cannot be measured before the gas flow rate verification unit 11 is mounted in the external system. Therefore, they are measured ex-post after the gas flow rate verification unit 11 is manufactured and mounted in the external system, and accordingly stored in the volume storing device 46.

The ROM 43 stores a flow rate verification program 48 and a volume measurement program 47 that is "a volume measuring device". The flow rate verification program 48 appropriately controls the opening and closing operation of the first and second cutoff valves 12 and 13 to detect the pressure and the temperature between the first and second cutoff valves 12 and 13 by the pressure sensor 14 and the temperature sensor 15, and performs the flow rate verification of the mass flow controller 10 on the basis of the result of the detection. The volume measurement program 47 measures the system channel volume Ve and the tank volume V.

<Relationship Between Known Volume and System Channel Volume>

As shown in FIGS. 3, 4 and 5, the gas flow rate verification unit 11 in the first embodiment does not have a chamber which is provided in the conventional technique. In the gas flow rate verification unit 11, the known volume Vk is set to be equal to or less than the system channel volume Ve. The reason of the known volume Vk set to be equal to or less than the system channel volume Ve is to prevent the pressure of the gas outputted from the mass flow controller 10 from being varied (dispersed) in the gas flow rate verification unit 11 due to the reduced channel in the gas flow rate verification unit 11. Accordingly, it is desirable that the known volume Vk in the gas flow rate verification unit 11 is reduced as much as possible upon mounting the first cutoff valve 12, the pressure sensor 14, the temperature sensor 15, and the second cutoff valve 13. In the first embodiment, the system channel volume Ve from the outlet of the mass flow controller 10 of each gas unit 2 to the valve seat 22 of the first cutoff valve 12 constituting the gas flow rate verification unit 11 is set to 100 cc in the gas box 1 shown in FIG. 1, while the known volume Vk from the valve seat 22 (see FIG. 5) of the first cutoff valve 12 constituting the gas flow rate verification unit 11 to the valve seat 28 (see FIG. 5) of the second cutoff valve 13 is set to 10 cc.

<Verification Method>

Figure 7:
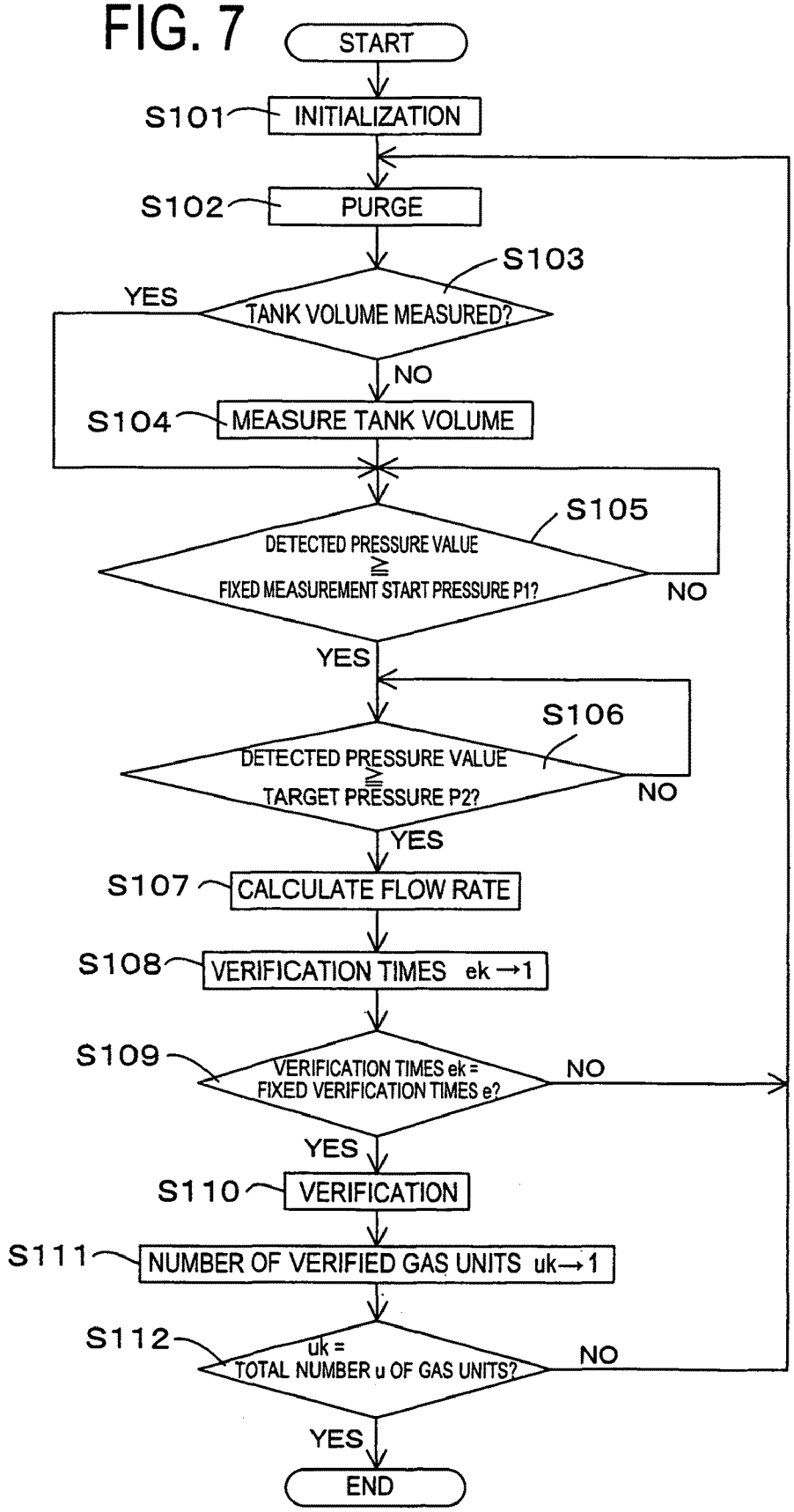
FIG. 7 is a flowchart showing a flow rate verification method executed by the gas flow rate verification unit according to the first embodiment.

Next, the outline of the verification method by the gas flow rate verification unit 11 according to the first embodiment will be explained. The outline is explained here since the verification method will specifically be described later in the explanation of the evaluation test. FIG. 7 is a flowchart showing a flow rate verification method executed by the gas flow rate verification unit 11 according to the first embodiment.

The gas flow rate verification unit 11 performs the flow rate verification for every one line of the gas unit 2. Specifically, at step 101 (hereinafter referred to as "S101"), the system is initialized to delete the data acquired in the previous flow rate verification. At S102, the gas supply integration unit is purged to remove unnecessary gases in the channel.

It is determined at S103 whether or not the tank volume has already been measured. When it is determined that the tank volume has not yet been measured (S103: NO), the tank volume V is measured at S104, and then, the program proceeds to S105. On the other hand, when it is determined that the tank volume has been measured (S103: YES), the program directly proceeds to S105.

It is determined at S105 whether or not the pressure value detected by the pressure sensor 14 is equal to or more than a fixed measurement start pressure P1. When the detected pressure value is less than the fixed measurement start pressure P1 (S105: NO), the controller 16 waits until the pressure sensor 14 measures the fixed measurement start pressure P1. On the other hand, when the pressure sensor 14 measures the fixed measurement start pressure P1 (S105: YES), it is determined at step S106 whether or not the pressure value detected by the pressure sensor 14 is a target pressure P2. The controller 16 waits until the pressure sensor 14 detects the target pressure P2 (S106: NO). Specifically, the gas flow rate verification system 11 waits until the pressure sensor 14 detects the target pressure P2. After the pressure sensor 14 detects the target pressure P2 (S106: YES), the controller 16 calculates the flow rate Q at S107.

Accordingly, the flow rate Q is measured by the processes at S105 to S107. The method of measuring the tank volume V and the flow rate Q will be explained in detail in the evaluation test.

Then, at S108, 1 is added to the number of times of the verification ek, and at S109, it is determined whether or not the number of times of the verification ek is a fixed number of times of the verification e. When the number of times of the verification ek is not the fixed number of times of the verification e (S109: NO), the controller 16 returns to S102 to repeat the purge and measurement of the flow rate Q. After the tank volume V and the flow rate Q are measured until the number of times of the verification ek becomes the fixed number of times of the verification e (S109: YES), the measured values of the flow rate Q are averaged at S110, and the average value is compared to the set flow rate of the mass flow controller 10 for executing the verification. Upon the verification, the corrected value of the flow rate Q is set as needed. Thus, the flow rate verification for one gas unit 2 is completed.

At S111, 1 is added to a number of the gas units that have been verified uk, and at S112, it is determined whether or not the number of the gas units that have been verified uk reaches the total number u of the gas units 2 mounted in the gas supply integration unit. When the number of the gas units that have been verified uk does not reach the total number u (S112: NO), which means there are the gas units 2 that have not yet been verified, so the controller 16 returns to S102 to execute the flow rate verification of the mass flow controller 10 mounted in the next gas unit 2. On the other hand, when the number of the gas units that have been verified uk reaches the total number u (S112: YES), which means that the flow rate verification has been completed for all of the gas units 2 mounted in the gas supply integration unit, the flow rate verification process is ended.

<Evaluation Test>

Figure 8:
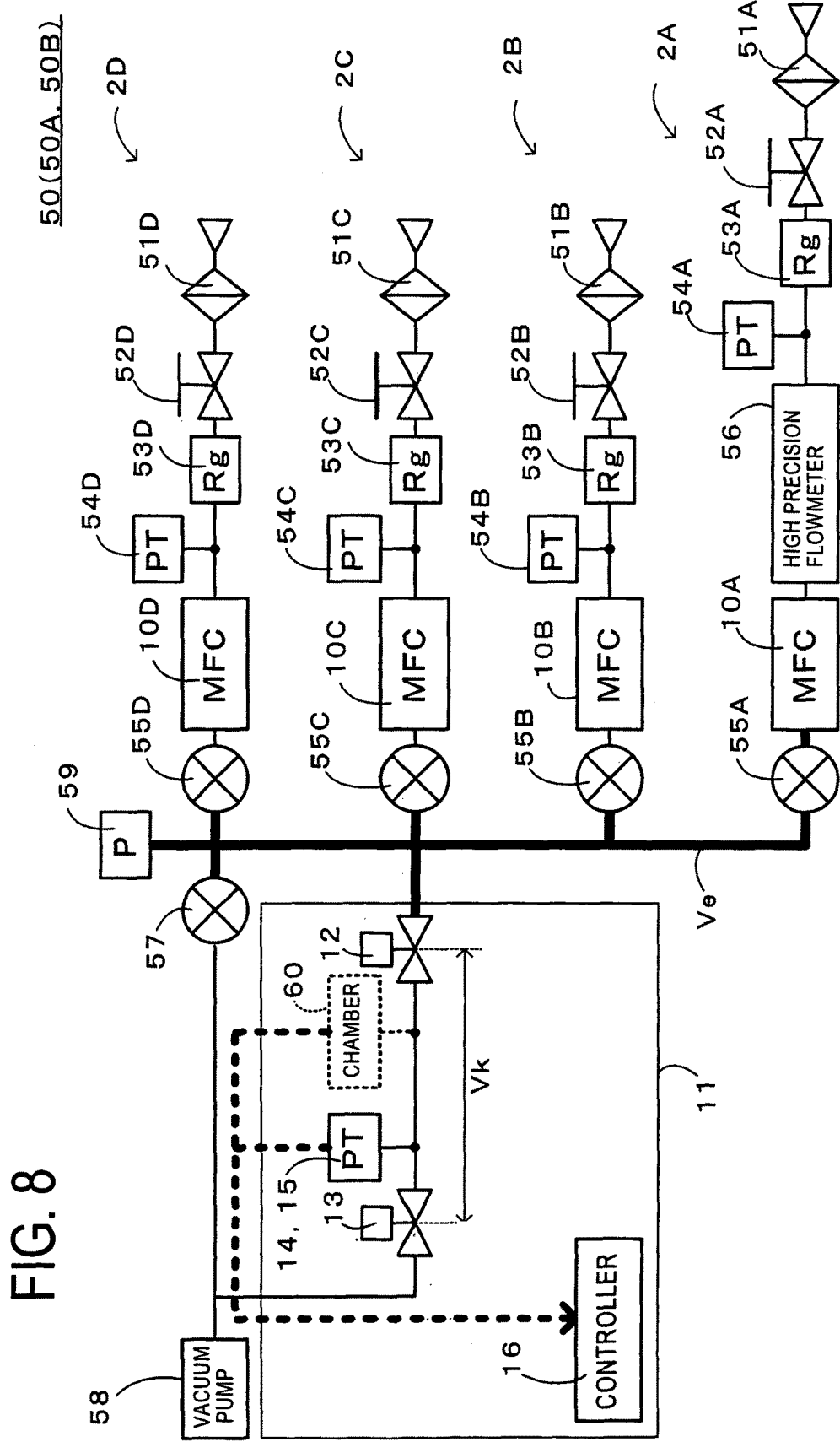
FIG. 8 is a block diagram of an evaluation device.

The present inventors have conducted the evaluation test for the gas flow rate verification unit 11 according to the first embodiment. FIG. 8 is a block diagram of an evaluation device 50.

The evaluation device 50 is configured by connecting four gas units 2A, 2B, 2C and 2D to the gas flow rate verification unit 11 in parallel. In the following explanation, four gas units are collectively referred to as "gas unit 2" if there is no need to distinguish each of the gas units. The fluid control devices constituting the gas units 2 are designated with only the numeral with the appended alphabets "A", "B", "C", and "D" omitted.

The gas unit 2 is formed by integrally coupling a filter 51, a manual valve 52, a regulator 53, a pressure thermometer 54, the mass flow controller 10, and an output cutoff valve 55 in series from the upstream side. In the gas unit 2A, a high-precision flowmeter 56 is provided between the pressure thermometer 54A and the mass flow controller 10A in order to precisely measure the controlled flow rate of the mass flow controller 10A. The gas units 2A, 2B, 2C and 2D are connected to a gas supply valve 57 in parallel, and coupled to a vacuum pump 58 through the gas supply valve 57. A pressure gauge 59 is provided on the system channel that communicates the gas unit 2 with the gas supply valve 57 for detecting the pressure in the system channel. The gas flow rate verification unit 11 is provided on a branch channel that is branched from the system channel and coupled between the gas supply valve 57 and the vacuum pump 58.

The evaluation test was carried out by appropriately changing the structure of the evaluation device 50. Specifically, the devices described below were used in the evaluation test: (i) the evaluation device 50A that is configured to use the gas flow rate verification unit 11 as unchanged as shown in FIG. 8; (ii) the evaluation device 50B that is configured such that a chamber 60 of 500 cc was mounted in the gas flow rate verification unit 11 to communicate with the main channel 36 of the channel block 18 as indicated by a dotted line in FIG. 8; and (iii) the evaluation device 50C that is configured by replacing the gas flow rate verification unit 11 shown in FIG. 8 with the conventional gas flow rate verification unit U shown in FIG. 19.

<Evaluation Testing Method>

The evaluation test was carried out for the evaluation devices 50A, 50B and 50C used in (i), (ii) and (iii). In the evaluation test, the tank volume V (Ve+Vk) and the system channel volume Ve were firstly measured, and subsequently, an error measurement was repeated five times to calculate the average value of the errors. The errors measurements was made by calculating the errors caused between the flow rate calculated by the gas flow rate verification unit and the flow rate measured by the high precision flowmeter 56. The errors were measured in case where the control flow rate of the mass flow controller 10 was set to a large flow rate (500 sccm) and in case where the control flow rate of the mass flow controller 10 was set to a small flow rate (100 sccm), respectively. The results of the measurement of the errors in each of the cases (i), (ii), and (iii) were compared as shown in FIG. 10. The method of the evaluation test is specifically described below.

<Measurement of Volume>

When the gas flow rate verification unit 11 is connected to an external system, the system channel volume Ve from the outlet of the mass flow controller 10 to the valve seat 22 of the first cutoff valve 12 constituting the gas flow rate verification unit 11 varies depending upon the structure of the channel of the external system. In other words, the tank volume V varies depending upon the external system. Therefore, prior to the gas flow rate verification, the gas flow rate verification unit 11 measures the tank volume V and the system channel volume Ve. The controller 16 executes the volume measurement program 47, thereby the tank volume V and the system channel volume Ve are measured.

In the measurement of the tank volume V, the output cutoff valves 55B, 55C and 55D of the gas units 2B, 2C and 2D and the gas supply valve 57 are closed, while the manual valve 52A and the output cutoff valve 55A of the gas unit 2A, and the first cutoff valve 12 and the second cutoff valve 13 of the gas flow rate verification unit 11 are opened, and then, $N_2$ gas is supplied to the mass flow controller 10A in increments of 50 sccm, while drawing the vacuum by use of the vacuum pump 58. After the flow rate is stabilized, the second cutoff valve 13 of the gas flow rate verification unit 11 is closed. Accordingly, the pressure in the system channel and the pressure in the channel of the gas flow rate verification unit 11 increase, so that the pressure value detected by the pressure sensor 14 increases. In this case, after the second cutoff valve 13 is closed, the time from when the pressure sensor 14 measures the measurement start pressure P1 (5 kPa in the first embodiment) to when the pressure sensor 14 measures the target pressure P2 (13 kPa in the first embodiment) is counted, and the temperature is measured by the temperature sensor 15.

Figure 9:
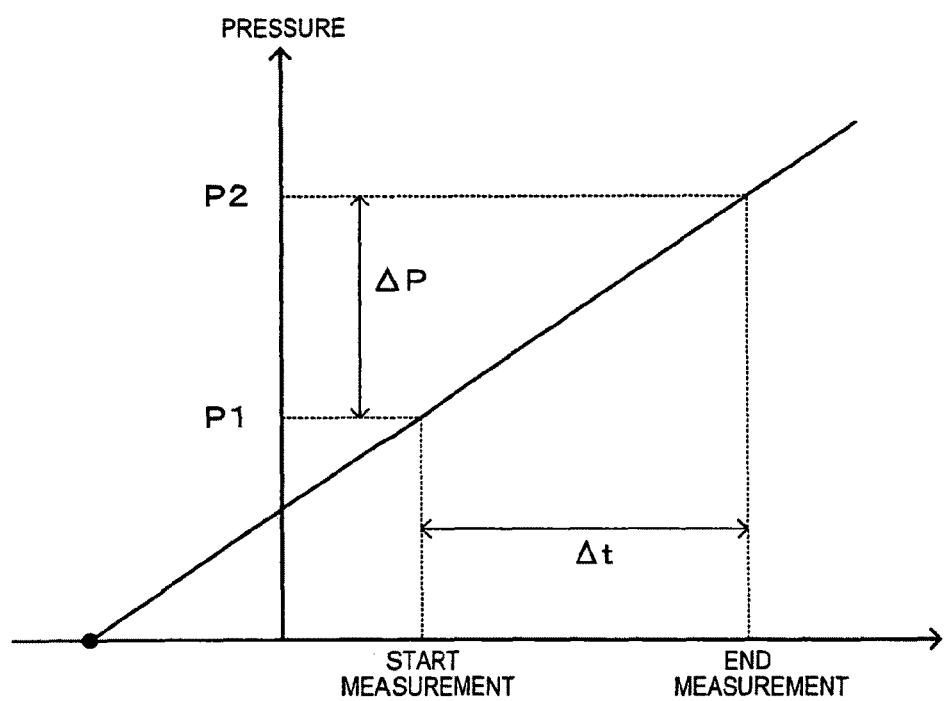
FIG. 9 is a graph showing a relation between pressure and time wherein a longitudinal axis indicates the pressure and a lateral axis indicates the time.

As shown in FIG. 9, the pressure increase amount ΔP that is the increase amount from the fixed measurement start pressure P1 to the target pressure P2 is obtained by subtracting the fixed measurement start pressure P1 from the target pressure P2. The pressure sensor 14 detects the pressure at a constant interval (e.g., at an interval of 0.1 second). Therefore, the measurement time Δt during when the pressure between the first cutoff valve 12 and the second cutoff valve 13 increases from P1 to P2 is obtained by counting the number of times of the pressure detection from the detection of the measurement start pressure P1 by the pressure sensor 14 to the detection of the target pressure P2 by the pressure sensor 14. The pressure increase amount ΔP is divided by the measurement time Δt, thereby the increasing pressure amount ΔP/Δt per unit time is obtained. The gas constant of the used gas ($N_2$ gas in the first embodiment) is used as the gas constant R. The gas temperature T is obtained from the detection by the temperature sensor 15. The flow rate Q is obtained by inputting the set flow rate (flow rate measured by the high precision flowmeter 56 (50 sccm in the first embodiment)) of the mass flow controller 10. Therefore, the obtained numerical values are applied into an equation 2 that is a modification of the equation 1, which is the basis of the calculation of the flow rate, thereby the tank volume V is calculated.

$$\text{Flow rate } Q = \frac{\Delta P}{\Delta t} \times \frac{V}{RT} \quad \text{[Equation 1]}$$

In the equation, ΔP indicates the pressure (Pa), Δt indicates the measurement time (s), V indicates the tank volume ($m^3$), R indicates the gas constant (J/mol·K), and T indicates the gas temperature (K).

$$V = \frac{\Delta t \cdot \text{Flow rate } Q \cdot RT}{\Delta P} \quad \text{[Equation 2]}$$

The tank volume V was repeatedly measured ten times as described above, and the average value of the tank volumes V is calculated. This average value is defined as the tank volume V, and stored in the volume storing device 46 of the controller 16.

The tank volume V corresponds to the volume obtained by adding the known volume Vk and the system channel volume Ve. The known volume Vk has been stored beforehand in the volume storing device 46. Therefore, the known volume Vk is subtracted from the tank volume V to measure the system channel volume Ve. The measured system channel volume Ve is stored in the volume storing device 46.

<Measurement of Error>

The errors are measured in such a manner that the controller 16 executes the flow rate verification program to carry out the flow rate verification, and the flow rate calculated by the gas flow rate verification unit and the flow rate measured by the high precision flowmeter 56 are compared.

When the flow rate verification of the gas unit 2A is carried out, the output cutoff valves 55B, 55C, and 55D of the gas units 2B, 2C and 2D, and the gas supply valve 57 are closed, while the manual valve 52A and the output cutoff valve 55A of the gas unit 2A and the first cutoff valve 12 and the second cutoff valve 13 of the gas flow rate verification unit 11 are opened. In this state, $N_2$ gas is supplied to the mass flow controller 10A. After the $N_2$ gas is supplied for 30 seconds, the second cutoff valve 13 of the gas flow rate verification unit 11 is closed in order to stabilize the control flow rate of the mass flow controller 10A.

Accordingly, the pressure in the gas flow rate verification unit 11 increases. Then, the time from when the pressure sensor 14 measures the measurement start pressure P1 (5 kPa) to when the pressure sensor 14 measures the target pressure P2 (13 kPa) is counted. The reason of counting the time is because the pressure increase time varies depending upon the flow rate. Specifically, the time for the pressure to increase from 5 kPa to 13 kPa is 7.5 seconds in the case of the flow rate of 100 sccm, and 1.5 seconds in the case of the flow rate of 500 sccm. After the pressure sensor 14 detects 13 kPa, the second cutoff valve 13 is opened to proceed to the next flow rate verification.

The gas flow rate verification unit 11 calculates the flow rate as described below. The pressure increase amount ΔP between the first cutoff valve 12 and the second cutoff valve 13 is obtained by subtracting the fixed measurement start pressure P1 from the target pressure P2. The pressure sensor 14 detects the pressure at a constant interval (e.g., at an interval of 0.1 second). Therefore, the measurement time Δt during when the pressure between the first and second cutoff valves 12 and 13 increases from P1 to P2 is obtained by counting the number of times of the pressure detection from the detection of the measurement start pressure P1 by the pressure sensor 14 to the detection of the target pressure P2 by the pressure sensor 14. The pressure increase amount ΔP is divided by the measurement time Δt, thereby the increasing pressure value ΔP/Δt per unit time is obtained. The gas constant of the used gas ($N_2$ gas in the first embodiment) is used as the gas constant R. The gas temperature T is obtained from the detection of the temperature sensor 15. The tank volume V is grasped since it is stored in the volume storing device 46 by the above-mentioned volume measurement. Therefore, the obtained numerical values (the increasing pressure amount ΔP/Δt per unit time, the gas constant R, the temperature T, and the tank volume V) are applied into the equation 1, thereby the flow rate Q is calculated.

The gas flow rate verification unit 11 compares the calculated flow rate Q with the set flow rate of the mass flow controller 10. When they agree with each other, it is determined that the mass flow controller 10 appropriately controls the flow rate. If they do not agree with each other, it is determined that the mass flow controller 10 does not appropriately control the flow rate, and the calibration of the mass flow controller 10 is performed as needed.

The flow rate Q calculated by the gas flow rate verification unit 11 is compared to the flow rate measured by the high precision flowmeter 56 to determine an error. The reason of this is as follows. The high precision flowmeter 56 has very high detection precision, and hence, the flow rate measured by the high precision flowmeter 56 is extremely close to the true value of the flow rate controlled by the mass flow controller 10A. Therefore, when the flow rate Q calculated by the gas flow rate verification unit 11 and the flow rate measured by the high precision flowmeter 56 are compared to obtain an error, the precision in the flow rate verification of the gas flow rate verification unit 11 can be determined.

<Result of Evaluation>

The result of the evaluation through the measurement of the errors as described above will be explained with reference to FIG. 10. When the inventors evaluated the conventional gas flow rate verification unit U by using the evaluation device 50C, the error between the flow rate Q13 calculated by the conventional gas flow rate verification unit U and the true value of the mass flow controller 10A measured by the high precision flowmeter 56 is small such as 0.012% (see black dot in FIG. 10) as shown in FIG. 10(iii), in the case of the flow rate of the mass flow controller 10A is 100 sccm. The present inventors have considered that the reason why the precision in the flow rate verification is excellent in the conventional unit U is because the chamber 153 is provided as shown in FIG. 19.

Specifically, in general, the volume between the valve components 151 and 152 decreases, so that the pressure rises in a short period, when the valve components 151 and 152 are close to each other. When the increasing pressure amount (the gradient of the graph in FIG. 9) per unit time becomes too great, the valve component 152 is opened before the transducer assembly 154 outputs the signal directly indicating the PV/RT, resulting in the flow rate verification being impossible. Consequently, the present inventors have considered that, in order to surely execute the flow rate verification, the chamber is required between the valve component 151 and the valve component 152 to increase the known volume Vk.

It is further desirable that the increasing pressure amount (the gradient of the graph in FIG. 9) per unit time is decreased in order to execute the flow rate verification with high precision. However, when the increasing pressure amount is too decreased, there arises a problem that the time for the flow rate verification is longer. Therefore, the present inventors have considered that, in order to secure the pressure measuring time, the volume of the chamber 153 has to be determined considering the flow rate verification time allowed in the semiconductor manufacturing process.

On the other hand, the present inventors have considered that the gas flow rate verification unit 11 is configured by integrating the first cutoff valve 12, the second cutoff valve 13, the pressure sensor 14, and the temperature sensor 15 into the channel block 18, by which the size of the gas flow rate verification unit 11 is made compact more than the conventional gas flow rate verification unit U in which the valve components 151 and 152 are connected by use of a pipe. The present inventors have made the evaluation device 50B by mounting a chamber 60 in the gas flow rate verification unit 11 in order to enhance the precision in the flow rate verification. In this case, the present inventors have mounted the chamber 60 having a volume of 500 cc, which is greater than the chamber 153 used in the conventional gas flow rate verification unit U, in the gas flow rate verification unit 11, in order to remarkably enhance the precision in the flow rate verification.

When the present inventors further conducted the evaluation test by using the evaluation device SOB the error between the flow rate Q12 calculated by the gas flow rate verification unit provided with the chamber 60 and the true value was 0.099% (see black dot in the figure), in the case of the flow rate of the mass flow controller 10A of 100 sccm, as shown in FIG. 10(ii). Considering the meaning of the presence of the chamber, the precision in the flow rate verification should be enhanced by the increased volume of the chamber 60 than the chamber 153. However, the result of the evaluation of the gas flow rate verification unit provided with the chamber 60 was poorer than the result of the evaluation of the conventional gas flow rate verification unit U.

When the present inventors conducted the evaluation test by using the evaluation device 50A, the error between the flow rate Q11 calculated by the gas flow rate verification unit 11 and the true value was 0.014% (see black dot in the figure), in the case of the flow rate of the mass flow controller 10A of 100 sccm, as shown in FIG. 10(i). Considering the meaning of the presence of the chamber, the result of the evaluation of the gas flow rate verification unit 11 must be poorer than the result of the evaluation of the conventional gas flow rate verification unit U, and further, must be poorer than the result of the evaluation of gas flow rate verification unit provided with the chamber 60. However, the result of the evaluation was more satisfactory than the result of the evaluation of the gas flow rate verification unit provided with the chamber 60, and further, the result of the evaluation became poorer than the result of the evaluation of the conventional gas flow rate verification unit U only by 0.002%.

From the above-mentioned results of the evaluation, the present inventors have found that the precision in the flow rate verification does not depend upon the presence or absence of a chamber.

The present inventors evaluated the precision in the flow rate verification by using the evaluation devices 50A, 50B and 50C with the flow rate increased to 500 sccm, in order to examine the precision in the flow rate verification within a flow-rate verifiable range.

In case where 500 sccm of $N_2$ gas was supplied to the evaluation device 50A, the error between the flow rate Q21 calculated by the gas flow rate verification unit 11 and the true value was 0.515% (see black solid triangle in the figure), as shown in FIG. 10(i). Comparing the error (0.014%) in the case of flowing a small amount of 100 sccm of $N_2$ gas and the error (0.515%) in the case of flowing a large amount of 500 sccm of $N_2$ gas, the difference between them was 0.501%.

In case where 500 sccm of $N_2$ gas was supplied to the evaluation device 50B, the error between the flow rate Q22 calculated by the gas flow rate verification unit U provided with the chamber 60 and the true value was 0.982% (see black solid triangle in the figure), as shown in FIG. 10(ii). Comparing the error (0.099%) in the case of flowing a small amount of 100 sccm of $N_2$ gas and the error (0.982%) in the case of flowing a large amount of 500 sccm of $N_2$ gas, the difference between them was 0.883%.

In case where 500 sccm of $N_2$ gas was supplied to the evaluation device 50C, the error between the flow rate Q23 calculated by the conventional gas flow rate verification unit U and the true value was 1.150% (see black solid triangle in the figure), as shown in FIG. 10(iii). Comparing the error (0.012%) in the case of flowing a small amount of 100 sccm of $N_2$ gas and the error (1.150%) in the case of flowing a large amount of 500 sccm of $N_2$ gas, the difference between them was 1.138%.

Examining the result of the evaluation, it was found that the unit providing the most stable precision in the flow rate verification within the flow-rate verifiable range was the gas flow rate verification unit 11, and the unit providing the most unstable precision was the conventional gas flow rate verification unit U. If the variation in the precision in the flow rate verification within the flow-rate verifiable range is due to the chamber, the variation in the precision in the flow rate verification produced by the gas flow rate verification unit provided with the chamber 60 of 500 cc must be greater than the variation in the precision in the flow rate verification produced by the conventional gas flow rate verification unit U. However, in the result of the evaluation, the variation in the precision in the flow rate verification produced by the conventional gas flow rate verification unit U is greater than the variation in the precision in the flow rate verification produced by the gas flow rate verification unit provided with the chamber 60 of 500 cc. From the result of the evaluation, the present inventors have confirmed that the unit structure of the gas flow rate verification unit 11 is more excellent than the conventional gas flow rate verification unit U from the viewpoint of a compact size, and further, is more excellent than the conventional gas flow rate verification unit U in reducing the variation in the precision in the flow rate verification.

The reason why the precision in the flow rate verification of the gas flow rate verification unit 11 is more excellent than that of the conventional gas flow rate verification unit U will be examined below.

The first reason is that the known volume Vk is not more than the system channel volume Ve. While the system channel volume Ve is 100 cc, the known volume Vk of the gas flow rate verification unit 11 is 10 cc. The known volume Vk of the gas flow rate verification unit provided with the chamber 60 is more than 500 cc, and the known volume Vk of the conventional gas flow rate verification unit U is more than 250 cc. In other words, only the known volume Vk of the gas flow rate verification unit 11 is smaller than the system channel volume Ve. When the chamber is provided to increase the known volume Vk, the gas is slowly flown into the chamber as long as the flow rate is small, so that the pressure balance in the gas flow rate verification unit is easy to be uniform. However, when the flow rate becomes large, the pressure between the first cutoff valve 12 (valve component 151) and the second cutoff valve 13 (valve component 152) sharply rises before the gas enters the chamber to increase the pressure, whereby the pressure balance in the gas flow rate verification unit is made non-uniform. Therefore, when the pressure and the temperature of the chamber are detected to perform the flow rate verification, the pressure and the temperature between the first cutoff valve 12 (valve component 151) and the second cutoff valve 13 (valve component 152) cannot correctly be detected as the flow rate increases, with the result that it is considered that the error is likely to be generated between the flow rate verified by the gas flow rate verification unit and the true value. Accordingly, it is considered that the precision in the flow rate verification is enhanced by setting the known volume Vk to be equal to or less than the system channel volume Ve.

The second reason is that the channel structure is simple. The gas flow rate verification unit provided with the chamber 60 is the same as the conventional gas flow rate verification unit U in that both of them have chambers, but they are different in that the channel is composed of the channel block 18 in the gas flow rate verification unit provided with the chamber 60 while the channel is composed of the pipe in the conventional gas flow rate verification unit U. The gas flow rate verification unit provided with the chamber 60 has poor flow rate verification precision during the control of the small flow rate, compared to the conventional gas flow rate verification unit U. However, the precision in the flow rate verification of the gas flow rate verification unit provided with the chamber 60 is more excellent than that of the conventional gas flow rate verification unit U during the control of a large flow rate. From this result, it is considered that the configuration in which the channel of the gas flow rate verification unit is formed with the channel block 18 simplifies the channel structure, compared to the case in which the channel is formed with a pipe, thus the precision in the gas flow rate verification during the control of the large flow rate can be enhanced.

The third reason is the reduced change in the sectional area of the channel. The gas flow rate verification unit 11 is different from the gas flow rate verification unit provided with the chamber 60 in the presence of the chamber 60. Comparing the error upon the small flow rate, the error in the gas flow rate verification unit 11 is smaller than the error in the gas flow rate verification unit provided with the chamber 60 by 0.085%, and comparing the error upon the large flow rate, the error in the gas flow rate verification unit 11 is smaller than the error in the gas flow rate verification unit provided with the chamber 60 by 0.467%. Specifically, the errors in the gas flow rate verification unit 11 upon the small flow rate and upon the large flow rate are reduced only by providing no chamber 60, and further, the error is suppressed as the flow rate increases. From this result, it is considered that, since there is no change in the sectional area of the channel between the channel block 18 and the internal channel in the case of providing no chamber 60, the flow of the gas is stabilized so as to enhance the precision in the flow rate verification, and further, even if the flow rate is increased, the error in the precision in the flow rate verification can be suppressed.

<Operations and Effects of Gas Flow Rate Verification Unit according to First Embodiment>

Accordingly, since the known volume Vk is not more than the system channel volume Ve in the gas flow rate verification unit 11 according to the first embodiment, the pressure between the first cutoff valve 12 and the second cutoff valve 13 is likely to be uniform even if the gas flow rate supplied between the first cutoff valve 12 and the second cutoff valve 13 is changed from the small flow rate of 100 sccm to the large flow rate of 500 sccm. Therefore, the gas flow rate verification unit 11 of the first embodiment can correctly detect the pressure and the temperature by the pressure sensor 14 and the temperature sensor 15, even if the gas flow rate supplied between the first and second cutoff valves 12 and 13 increases, thereby the gas flow rate can precisely be calculated and verified with the use of the result of the pressure detected by the pressure sensor 14 and the result of the temperature detected by the temperature sensor 15. Consequently, according to the gas flow rate verification unit 11 of the first embodiment, the error between the measured flow rate and the flow rate controlled by the mass flow controller 10 is reduced (see FIG. 10($i$)), thus the reliability with respect to the flow rate verification can be enhanced.

According to the gas flow rate verification unit 11 of the first embodiment, since the first cutoff valve 12, the second cutoff valve 13, and the pressure sensor 14 are screwed to the upper surface of the channel block 18 from above with the volt 40 to be integrated (see FIG. 5), the known volume Vk between the first cutoff valve 12 and the second cutoff valve 13 can be reduced to downsize the gas flow rate verification unit 11. Particularly, the chamber is eliminated and the devices 12, 13 and 14 are integrated on the channel block 18, so that the gas flow rate verification unit 11 of the first embodiment can provide a foot space about ⅔ times smaller than that of the conventional gas flow rate verification unit U. Since the known volume Vk between the first and second cutoff valves 12 and 13 is reduced, the time taken for the pressure between the first and second cutoff valves 12 and 13 to reach the target pressure can be shortened, thus shortening the verification time of the gas flow rate.

In the gas flow rate verification unit 11 of the first embodiment, the bar-like temperature sensor 15 is inserted into the insertion hole 38 of the channel block 18 to measure the temperature of the channel block 18, thus the change in the temperature of the gas supplied between the first and second cutoff valves 12 and 13 (see FIG. 5) is detected. Therefore, the temperature sensor 15 can be mounted in the gas flow rate verification unit 11 with the known volume Vk between the first and second cutoff valves 12 and 13 being reduced.

According to the gas flow rate verification unit 11 of the first embodiment, the gas flow rate verification unit 11 is housed in the gas box 1 by utilizing the dead space formed between the gas unit 2 having the mass flow controller 10 mounted therein and the gas box 1. Therefore, there is no need to change the structure of the external pipe of the gas box 1 for arranging the installation space for the gas flow rate verification unit 11. Accordingly, the gas flow rate verification unit 11 of the first embodiment can provide an excellent installation property.

In the gas flow rate verification unit 11 of the first embodiment, the system channel volume Ve is measured when the volume measurement program 47 is executed by the controller 16. Specifically, when the gas is filled between the mass flow controller 10 and the second cutoff valve 13 only by the target pressure P2, the increasing pressure value ΔP/Δt per a unit time while the time from when the pressure sensor 14 detects the fixed measurement start pressure P1 to the time when the pressure sensor 14 detects the target pressure P2 is calculated, and the temperature sensor 15 detects the gas temperature T when the pressure reaches the target pressure P2. Then, the pressure increase value ΔP/Δt and the gas temperature T are applied into the equation 1 together with the control flow rate Q of the mass flow controller 10 and the gas constant R to measure the tank volume V from the mass flow controller 10 to the second cutoff valve 13. Thereafter, the known volume Vk is read out from the volume storing device 46, and the known volume Vk is subtracted from the tank volume V, thereby the system channel volume Ve is measured. Consequently, according to the gas flow rate verification unit 11 of the first embodiment, even if the system channel volume Ve varies depending upon the system structure in which the unit is mounted, the influence made by the variation is eliminated, so that the precision in the gas flow rate verification can be kept satisfactory.

Second Embodiment

The second embodiment of the gas flow rate verification unit according to the present invention will be explained with reference to the drawings. FIG. 11 is a block diagram showing one example of a gas supply integration unit 63 provided with a gas flow rate verification unit 11A.

The gas flow rate verification unit 11A according to the second embodiment is used for performing the flow rate verification of the gas supply integration unit 63 shown in FIG. 11. The circuit structure of the gas supply integration unit 63 is the same as that of the evaluation device 50 (see FIG. 8) described in the first embodiment, so that the numerals same as those in the evaluation device 50 are given to the fluid control devices. The structure of the controller 61 in the gas flow rate verification unit 11A according to the second embodiment is different from the controller 16 in the first embodiment. Therefore, the points different from the first embodiment will mainly be explained, and the same referential codes in the first embodiment are given to the same components in the figures for suitably omitting the explanations thereof.

<Electric Structure of Controller>

FIG. 12 is an electric block diagram of a controller 61 used in the gas flow rate verification unit 11A according to the second embodiment.

The controller 61 is different from the controller 16 (see FIG. 6) in the first embodiment in that a pressure gauge 59, a vacuum pump 58, and an output cutoff valve 55 of the gas supply integration unit 63 are connected to an input/output interface 42. The pressure gauge 59 detects the pressure of the system channel (see FIG. 11) that communicates the gas units 2 with the gas supply valve 57, and outputs a pressure detection signal to the controller 61. The vacuum pump 58 evacuates the gas supply integration unit 63 in receipt of the instruction from the controller 61. The output cutoff valve 55 is closed or opened in receipt of the instruction from the controller 61 so as to control the output of the process gas in the gas units 2.

The controller 61 stores a volume measurement program 62, which is "a volume measuring device", into the ROM 43. The volume measurement program 62 is different from the volume measurement program 47 in the first embodiment in a manner that the volume measurement program 62 calculates the system channel volume Ve and the tank volume V by utilizing the Combined gas law (Boyle-Charles law) while the measurement program 47 calculates the tank volume V by using the equation 2.

<Measurement of Volume>

The tank volume V and the system channel volume Ve are measured by executing the volume measurement program 62 by the controller 61. Here, the case in which the volume is measured by using the gas supply integration unit 63 (see FIG. 11) which includes the circuit structure same as that in the evaluation device 50 (see FIG. 8) will be explained as an example.

Firstly, the output cutoff valves 55A, 55B, 55C and 55D and the gas supply valve 57 shown in FIG. 11 are closed, and the first cutoff valve 12 and the second cutoff valve 13 of the gas flow rate verification unit 11A are opened. Then, the vacuum pump 58 is driven to evacuate the downstream side of the output cutoff valve 55A. After the pressure sensor 14 detects a predetermined pressure (5 kPa) and the completion of the evacuation is confirmed, the manual valve 52A and the output cutoff valve 55A of the gas unit 2A is changed to the opened state from the closed state, and $N_2$ gas is supplied in the gas unit 2A. When the second cutoff valve 13 is closed, the pressure in the channel from the mass flow controller 10A to the second cutoff vale 13 increases. The output cutoff valve 55A is changed from the opened state to the closed state to stop the supply of the $N_2$ gas at the point when the pressure sensor 14 detects the predetermined pressure (13 kPa). Subsequently, the first cutoff valve 12 is closed, the second cutoff valve 13 is opened, and then, the vacuum pump 58 is driven to form a vacuum region between the valve seat 22 of the first cutoff valve 12 and the valve seat 28 of the second cutoff valve 13. Thereafter, the first cutoff valve 12 is changed from the closed state to the opened state so as to discharge the $N_2$ gas into the vacuum region. At this time, the pressure sensor 14 detects the variation of the pressure, and the temperature sensor 15 detects the temperature of the channel block 18, i.e., the gas temperature.

The pressure P11 detected by the pressure sensor 14 immediately before the $N_2$ gas is discharged to the vacuum region, the temperature T11 detected by the temperature sensor 15 immediately before the $N_2$ gas is discharged to the vacuum region, a volume measurement completion pressure P12 for completing the volume measurement after the $N_2$ gas is discharged to the vacuum region, and the temperature T12 detected by the temperature sensor 15 when the pressure reaches the volume measurement completion pressure P12 are applied to the Combined gas law ($P11 \cdot V11/T11 = P12 \cdot V12/T12$). Accordingly, the volume V12 is obtained. Since the volume V12 is the volume after the first cutoff valve 12 is opened, it corresponds to the tank volume V. Therefore, the known volume Vk is subtracted from the tank volume V to measure the system channel volume Ve. The tank volume V and the system channel volume Ve measured as described above are stored in the volume storing device 46.

<Operations and Effects of Gas Flow Rate Verification Unit According to Second Embodiment>

As described above, in the gas flow rate verification unit 11A according to the second embodiment, the second port 27 of the second cutoff valve 13 is connected to the vacuum pump 58, and the controller 61 is connected to the pressure gauge 59 that detects the pressure between the outlet of the mass flow controller 10 and the valve seat 22 of the first cutoff valve 12 and the output cutoff valve 55 of the gas unit 2 (see FIGS. 11 and 12). The controller 61 executes the volume measurement program 62 wherein the system channel volume Ve is measured. Specifically, when the portion between the first cutoff valve 12 and the second cutoff valve 13 is evacuated by the vacuum pump 58, and the gas filled between the mass flow controller 10 and the first cutoff valve 12 is discharged between the first and second cutoff valves 12 and 13, the pressure change and the temperature change between the first and second cutoff valves 12 and 13 are detected by the pressure sensor 14 and the temperature sensor 15 respectively, and the result of the pressure detection and the result of the temperature detection are applied to the Combined gas law to measure the tank volume V. The known volume Vk is read out from the volume storing device 46, and the known volume Vk is subtracted from the tank volume V, thereby the system channel volume Ve is measured. Consequently, according to the gas flow rate verification unit 11A of the second embodiment, even if the system channel volume Ve varies depending upon the system structure in which the unit is mounted, the influence caused by the variation is eliminated to keep the precision in the gas flow rate verification satisfactory.

Third Embodiment

The third embodiment of the gas flow rate verification unit according to the present invention will be explained with reference to the drawings.

A gas flow rate verification unit 11B according to the third embodiment is obtained by improving the flow rate verification process of the gas flow rate verification unit 11 in the first embodiment in order to shorten the flow rate verification time. Therefore, the points different from the first embodiment will mainly be explained, and the same referential codes in the first embodiment are given to the same components in the figures for suitably omitting the explanations thereof.

FIG. 13 is a flowchart showing a gas flow rate verification method executed by the gas flow rate verification unit 11B according to the third embodiment. FIG. 14 is a graph showing data obtained by sampling the pressure values detected by the pressure sensor at an interval of a predetermined time in the gas flow rate verification unit according to the third embodiment of the present invention. FIG. 15 is a graph showing a data obtained by sampling the pressure values detected by the pressure sensor at an interval of a predetermined pressure in the gas flow rate verification unit according to the third embodiment. FIG. 16 is a view showing a relation between the gradient of the data shown in FIG. 14 or FIG. 15 and a measurable range X1. FIG. 17 is a view showing a relation between the correlation coefficient of the data shown in FIG. 14 or FIG. 15 and a measurable range X2.

As shown in FIG. 13, the gas flow rate verification unit 11B of the third embodiment is different from the first embodiment in that the gas flow rate verification unit 11B monitors the gradient of the pressure value detected by the pressure sensor 14 and the correlation coefficient with respect to the gradient of the pressure value, and if the gradient or the correlation coefficient are within the measurable ranges X1 and X2 (see FIGS. 16 and 17), it measures the flow rate Q to perform the verification even before the pressure sensor 14 detects the fixed measurement start pressure P1.

Specifically, after the tank volume V is measured at S104, the output cutoff valves 55B, 55C and 55D of the gas units 2B, 2C and 2D and the gas supply valve 57 are closed, while the manual valve 52A and the output cutoff valve 55A of the gas unit 2A, and the first cutoff valve 12 and the second cutoff valve 13 of the gas flow rate verification unit 11 are opened at S301. The verification gas (e.g., $N_2$ gas) is supplied to the mass flow controller 10 in this state. After the flow rate is stabilized, the second cutoff valve 13 is closed. In this case, the pressure $P_0$ detected by the pressure sensor 14 is stored. At S302, it is determined whether or not a predetermined time $\Delta t$ has elapsed by a clock pulse or the like. The unit waits until the predetermined time $\Delta t$ has elapsed (S302: NO).

On the other hand, when the predetermined time $\Delta t$ has elapsed (S302: YES), the pressure value $P_1$ is inputted from the pressure sensor 14 and stored as shown in FIG. 14 at S303. Then, at S304, the gradient of the pressure variation is calculated. Specifically, the pressure value $P_0$ obtained prior to the pressure value $P_1$ is subtracted from the pressure value $P_1$ that is most lately obtained to calculate the increasing pressure value $P_1-P_0$, and the increasing pressure value $P_1-P_0$ is divided by the time (predetermined time) $\Delta t$ that is from the time when the pressure value $P_0$ is obtained to the time when the latest pressure value $P_1$ is obtained, thereby calculating the pressure increase ratio (gradient) $P_1/\Delta t$ per a unit time.

At S305, it is determined whether or not the calculated gradient $P_1/\Delta t$ is within the measurable range X1 that is registered beforehand in the gas flow rate verification unit 11B. The pressure value P detected by the pressure sensor 14 sharply rises before a certain time has elapsed as shown by Y1 in FIG. 14, and then, increases with generally a constant gradient to reach the fixed measurement start pressure P1. The gas flow rate verification unit 11B stores the relation between the time and the gradient into the HDD 45 as map data as shown in FIG. 16, and stores the range, in which a margin is provided in the range of the gradient before the pressure reaches the fixed measurement start pressure P1 so as not to give adverse affect to the flow rate verification precision, as the measurable range X1 on the map data.

The gradient $P_1/\Delta t$ between $P_0-P_1$ shown in FIG. 14 is sharp, and it is determined not to be within the measurable range X1 registered beforehand to the gas flow rate verification unit 11B (S305: NO). In this case, the gradient of the pressure value P might be varied, by which the flow rate Q might not be precisely measured. Therefore, the program returns to S302 to obtain the next pressure value $P_2$ after the lapse of the predetermined time and executes the process described above.

When the pressure increase ratio (gradient) $P_n/\Delta t$ between the latest pressure value $P_n$ and the pressure value $P_{n-1}$ prior to the $P_n$ is calculated, and the calculated gradient $P_n/\Delta t$ is determined to be within the measurable range X1 registered beforehand to the gas flow rate verification unit 11B (S305: YES), the pressure variation afterwards is generally stabilized and gives no adverse affect to the flow rate verification precision. Therefore, the program proceeds to S306.

At S306, the pressure value $P_n$ when the gradient $P_n/\Delta t$ is determined to be within the measurable range X1 is stored as a measurement start pressure P21. In other words, the point when the gradient $P_n/\Delta t$ is determined to be within the measurable range X1 is a flow rate verification start timing.

At S307, it is determined whether or not the measurement time $\Delta tx$ has elapsed from the measurement of the measurement start pressure P21. Before the measurement time $\Delta tx$ has elapsed (S307: NO), the unit waits while monitoring the pressure value P of the pressure sensor 14.

On the other hand, when the measurement time Δtx has elapsed (S307: YES), the pressure value P when the measurement time Δtx has elapsed is inputted from the pressure sensor 14 and stored as a measurement end pressure P22.

The flow rate Q is calculated at S309. Specifically, the pressure difference P22–P21 between the measurement end pressure P22 and the measurement start pressure P21 is calculated, and the calculated pressure difference P22–P21 is divided by the measurement time Δtx, thereby calculating the pressure increase ratio P/Δt. The calculated pressure increase ratio P/Δt, the tank volume V calculated at step S104, the temperature T detected by the temperature sensor 15, and the gas constant R of the used gas are applied to the equation 1 so as to calculate the flow rate Q.

Thereafter, the program proceeds to S108. The process after S108 is described above, so that the explanation thereof is omitted.

As another example, the pressure value may be obtained with an interval of a predetermined pressure, and the correlation coefficient with respect to the gradient of the variation in the pressure value may be monitored, thereby the flow rate verification timing may be judged.

Specifically, as shown in S302 to S304 in FIG. 13, every time the pressure detected by the pressure sensor 14 increases by the predetermined pressure ΔP, the pressure value $P_n$ is stored. When the pressure value $P_n$ is acquired at an interval of the predetermined pressure, the interval $\Delta t_n$ of the pressure acquiring time is short to a certain time as shown by Y2 in FIG. 15, but a certain time has elapsed, the interval $\Delta t_n$ of the pressure acquiring time becomes generally constant. The correlation coefficient of the gradient of the pressure value approaches 1 within the range where the time $\Delta t_n$ of the pressure acquiring time becomes generally constant. Therefore, the correlation coefficient with respect to the gradient $\Delta P/\Delta t_n$ of the latest pressure value $P_n$ is calculated. The gas flow rate verification unit 11B sets, as the measurable range X2, the range in which a margin is provided in the range of the gradient to make the correlation coefficient generally close to 1 within the range of giving no adverse affect to the flow rate verification precision for the flow rate Q.

Accordingly, when the calculated correlation coefficient is out of the measurable range X2 (S305: NO), the pressure variation is not stabilized, and the pressure variation might give adverse affect to the verification of the flow rate Q. Therefore, the program returns to S302, where the pressure value $P_n$ is stored when the pressure increases by the predetermined pressure, and the process same as described above is executed.

On the other hand, when the correlation coefficient is within the measurable range X2 (S305: YES), the pressure variation is generally stabilized, and might not give adverse affect to the verification of the flow rate Q. Therefore, the program proceeds to S306. The process after S306 is as described above, so that the explanation thereof is omitted.

In case where the pressure is monitored with the time interval Δt as shown in FIG. 14, the flow rate verification start timing may be judged on the basis of whether or not the correlation coefficient with respect to the gradient of the variation of the pressure value belongs to the measurable range X2 (see FIG. 17). Alternatively, in case where the pressure is monitored with the pressure interval ΔP as shown in FIG. 15, the flow rate verification start timing may be judged on the basis of whether or not the gradient belongs to the measurable range X1 (see FIG. 16).

<Operations and Effects of Third Embodiment>

As explained above, if the pressure increase ratio (gradient) $P_n/\Delta t$ or $\Delta P/t_n$ or the correlation coefficient of the gradient of the pressure value P of $P_n/\Delta t$ or $\Delta P/t_n$ belongs to the measurable ranges X1 or X2 even before the pressure sensor 14 measures the fixed measurement start pressure P1, the gas flow rate verification unit 11B of the third embodiment measures the flow rate to perform the verification (see S302 to S309 in FIG. 13). On the other hand, the gas flow rate verification unit 11 in the first embodiment waits until the pressure sensor 14 detects the fixed measurement start pressure P1, and then, measures the flow rate Q to perform the verification (see S105 to S107 in FIG. 7).

In the flow rate verification, the purge and the flow rate measurement are repeatedly performed fixed verification number of times e in order to enhance the verification precision. Therefore, the gas flow rate verification unit in the first embodiment takes several minutes to complete the flow rate verification for one gas unit 2. On the other hand, the gas flow rate verification unit 11B performs the flow rate verification without waiting a dead time from when the pressure is generally stabilized to when the pressure reaches the fixed measurement start pressure P1. Accordingly, the time to complete the flow rate verification for one gas unit 2 can be made within one minute.

Accordingly, the gas flow rate verification unit 11B of the third embodiment performs the flow rate verification with the condition that the gradient of the pressure value or the correlation coefficient is within the measurable range X1 or X2 even before the pressure sensor 14 detects the fixed measurement start pressure P1 resulting in the verification time being shortened compared to the gas flow rate verification unit 11 of the first embodiment. In general, the gas supply integration unit has a great number of gas units 2 installed therein. Therefore, if the verification time for each gas unit 2 can be shortened, the verification time for the overall gas supply integration unit can remarkably shortened, so that a remarkable effect can be provided.

When the flow rate verification is performed before the pressure of the pressure sensor 14 reaches the fixed measurement start pressure P1, like the gas flow rate verification unit 11B of the third embodiment, there is a possibility that the precision is deteriorated. In view of this, a high precision flowmeter is mounted downstream of the mass flow controller 10 to measure the flow rate outputted from the mass flow controller 10 with the high precision flowmeter, and the flow rates measured by the gas flow rate verification units 11 and 11B in the first and third embodiments were compared to the measured value of the high precision flowmeter so as to examine the precision. The result of the examination is shown in FIG. 18.

FIG. 18 is a view showing a result of the experiment for the flow rate verification precision of the gas flow rate verification units 11 and 11B in the first and the third embodiments.

The structures are the same in the gas flow rate verification units 11 and 11B, but the flow rate verification process is only different. Therefore, the gas flow rate verification units 11 and 11B have the same tank volume V. It is supposed that the gas flow rate verification unit 11B monitors the pressure value P of the pressure sensor 14 at an interval of a predetermined time to judge the flow rate verification timing according to the gradient of the pressure value.

As shown in FIG. 18, the gas flow rate verification unit 11B of the third embodiment performs the flow rate verification with precision more excellent than that in the gas flow rate verification unit 11 of the first embodiment by only about 0.05%, even if the flow rate verification is executed before the pressure sensor 14 detects the fixed measurement start pressure P1. The increase is very slight such as 0.05% in terms of the numerical value. However, considering that the target precision of the mass flow controller 10 is 1%, the enhancement in the precision by 0.05% greatly contributes to the enhancement of reliability of the product. Accordingly, the gas flow rate verification unit 11B in the third embodiment can shorten the flow rate verification time, and further, can enhance the flow rate verification precision, compared to the gas flow rate verification unit 11 in the first embodiment.

The present invention is not limited to the above-mentioned embodiments, but various modifications are possible.

(1) For example, in the above-mentioned embodiments, the first cutoff valve 12, the second cutoff valve 13, and the pressure sensor 14 of the gas flow rate verification unit 11 are fixed to the single channel block 18. Alternatively, they may be connected with a pipe, or may be connected via plural channel blocks. Specifically, so long as the known volume Vk is not more than the system channel volume Ve, the channel of the gas flow rate verification unit 11 can appropriately be assembled.

(2) Although the mass flow controller 10 is employed as a flow rate control device in the above-mentioned embodiments, a device having a flow rate setting function, such as a pressure variation correcting constant flow rate valve or a flow rate control valve may be employed as a flow rate control device.

(3) For example, although a thermoelement is used as the temperature sensor 15 in the above-mentioned embodiments, a thermistor vacuum gauge or a Pirani gauge may be applied to a temperature detector. The temperature detector may be mounted to the side face of the channel block 18, may be mounted so as to thrust into the channel block 18 from above, or may be mounted in the internal channel of the channel block 18.

(4) For example, although the capacitive pressure sensor is employed as a pressure detector in the above-mentioned embodiments, a piezoresistance pressure sensor, manometer, or Mcleod gauge may be employed as a pressure detector.

(5) For example, although an electromagnetic valve of an electromagnetic driving system is employed as the first cutoff valve 12 and the second cutoff valve 13 in the above embodiments, a valve using the other driving system such as an air operate valve may be employed. Instead of the diaphragm valve, a poppet valve may be used.

(6) For example, although the gas flow rate verification unit 11 is housed in the gas box in the above-mentioned embodiments, the gas flow rate verification unit 11 may be connected to the gas unit that is mounted in a rail or a mounting plate and not housed in the gas box.

(7) For example, the tank volume V and the system channel volume Ve are stored ex post in the volume storing device 46 in the above-mentioned embodiments. Alternatively, when the gas flow rate verification unit 11 is incorporated in the gas box 1, and the tank volume V and the system channel volume Ve are found, the tank volume V and the system channel volume Ve may be stored in the volume storing device 46 as an initial value. In this case, when a user modifies the channel structure in the gas box, the defect in the flow rate verification involved with the change in the channel structure can be prevented by executing the volume measurement explained in the above-mentioned embodiments.

(8) In the third embodiment of the present invention, the measurement start pressure P21 and the measurement end pressure P22 are calculated on the basis of the measurement time tx to calculate a flow rate. On the other hand, a target pressure P23 may be set by adding an increase pressure, which is determined beforehand, to the measurement start pressure P21, and the time Δt taken for the pressure to increase from the measurement start pressure P21 to the target pressure P23 is counted in order to obtain the pressure increasing ratio (gradient) ΔP/Δt, per a unit time, in which the pressure increases from the measurement start pressure P21 to the target pressure P23. In this case, the flow rate Q can be calculated by applying the obtained pressure increasing ratio ΔP/Δt per a unit time to the equation 1.

The invention claimed is:

1. A gas flow rate verification unit to be mounted downstream of a flow rate control device, comprising:
    a first cutoff valve including a first input port to be connected to the flow rate control device for inputting a gas, a first output port for outputting the gas, and a first valve seat for communicating the first input port and the first output port;
    a second cutoff valve including a second input port to be connected to the first cutoff valve, a second output port for outputting the gas, and a second valve seat for communicating the second input port and the second output port;
    a communication member to be connected to the first output port and the second input port for communicating the first cutoff valve and the second cutoff valve with each other;
    a pressure detector for detecting a pressure of the gas supplied between the first cutoff valve and the second cutoff valve;
    a temperature detector for detecting a temperature of the gas supplied between the first cutoff valve and the second cutoff valve; and
    a control device for verifying a flow rate of the gas flowing through the flow rate control device by using a result of the pressure detected by the pressure detector and a result of the temperature detected by the temperature detector, wherein
    a volume of the gas from the first valve seat to the second valve seat is not more than a volume from an outlet of the flow rate control device to the first valve seat.

2. The gas flow rate verification unit according to claim 1, wherein
    the communication member is a channel block formed with a first port communicating with the first output port, a second port communicating with the second input port, and a third port communicating with the pressure detector, the first to third ports being opened in a same side face, and further formed with an internal channel communicating the first port, the second port, and the third port with one another.

3. The gas flow rate verification unit according to claim 2, wherein
    the temperature detector is a bar-like temperature sensor, and
    the channel block has a mounting portion in which the temperature sensor is mounted.

4. The gas flow rate verification unit according to claim 3, wherein
    the control device samples pressure values detected by the pressure detector at a predetermined interval to calculate a gradient between a newly sampled pressure value and a sampled pressure value prior to the newly sampled pressure value and verifies a flow rate of the gas when the calculated gradient becomes within a measurable range.

5. The gas flow rate verification unit according to claim 3, wherein
    the control device samples the pressure values detected by the pressure detector at a predetermined interval to calculate a correlation coefficient with respect to the gradient of the newly sampled pressure value and verifies the flow rate of the gas when the calculated correlation coefficient becomes within a measurable range.

6. The gas flow rate verification unit according to claim 2 is housed in a gas box including a gas unit in which the flow rate control device is mounted.

7. The gas flow rate verification unit according to claim 2, wherein the control device includes a volume measuring device for measuring a system channel volume defined by a channel from an outlet of the flow rate control device to the first valve seat by calculating an increasing pressure value per a unit time from the time when the pressure detector detects a fixed initial pressure to the time when the pressure detector detects a target pressure when the gas is filled between the outlet of the flow rate control device and the second valve seat by the target pressure with the first cutoff valve being opened and the second cutoff valve being closed, detecting the temperature of the gas upon the pressure detection by the temperature detector, measuring a tank volume defined by a channel from the outlet of the flow rate control device to the second valve seat by use of the pressure increase value and the gas temperature, and subtracting a known volume defined by a channel from the first valve seat to the second valve seat from the tank volume.

8. The gas flow rate verification unit according to claim 2, wherein the second output port is connected to a vacuum pump, and the control device includes a volume measuring device for measuring a system channel volume defined by a channel from an outlet of the flow rate control device to the first valve seat by measuring a tank volume defined by a channel from the outlet of the flow rate control device to the second valve seat by use of a pressure change and a temperature change between the first and second valve seats when a vacuum is provided between the first and second valve seats by the vacuum pump with the first cutoff valve being closed and the second cutoff valve being opened and then the gas filled between the outlet of the flow rate control device and the first valve seat is discharged between the first and second cutoff valves by opening the first cutoff valve from the valve closed-state, and by subtracting a known volume defined by a channel from the first valve seat to the second valve seat from the tank volume.

9. The gas flow rate verification unit according to claim 2, wherein the control device samples pressure values detected by the pressure detector at a predetermined interval to calculate a gradient between a newly sampled pressure value and a sampled pressure value prior to the newly sampled pressure value and verifies a flow rate of the gas when the calculated gradient becomes within a measurable range.

10. The gas flow rate verification unit according to claim 2, wherein the control device samples the pressure values detected by the pressure detector at a predetermined interval to calculate a correlation coefficient with respect to the gradient of the newly sampled pressure value and verifies the flow rate of the gas when the calculated correlation coefficient becomes within a measurable range.

11. The gas flow rate verification unit according to claim 1 is housed in a gas box including a gas unit in which the flow rate control device is mounted.

12. The gas flow rate verification unit according to claim 11, wherein the control device samples pressure values detected by the pressure detector at a predetermined interval to calculate a gradient between a newly sampled pressure value and a sampled pressure value prior to the newly sampled pressure value and verifies a flow rate of the gas when the calculated gradient becomes within a measurable range.

13. The gas flow rate verification unit according to claim 11, wherein the control device samples the pressure values detected by the pressure detector at a predetermined interval to calculate a correlation coefficient with respect to the gradient of the newly sampled pressure value and verifies the flow rate of the gas when the calculated correlation coefficient becomes within a measurable range.

14. The gas flow rate verification unit according to claim 1, wherein the control device includes a volume measuring device for measuring a system channel volume defined by a channel from an outlet of the flow rate control device to the first valve seat by calculating an increasing pressure value per a unit time from the time when the pressure detector detects a fixed initial pressure to the time when the pressure detector detects a target pressure when the gas is filled between the outlet of the flow rate control device and the second valve seat by the target pressure with the first cutoff valve being opened and the second cutoff valve being closed, detecting the temperature of the gas upon the pressure detection by the temperature detector, measuring a tank volume defined by a channel from the outlet of the flow rate control device to the second valve seat by use of the pressure increase value and the gas temperature, and subtracting a known volume defined by a channel from the first valve seat to the second valve seat from the tank volume.

15. The gas flow rate verification unit according to claim 1, wherein the second outlet port is connected to a vacuum pump, and the control device includes a volume measuring device for measuring a system channel volume defined by a channel from and outlet of the flow rate control device to the first valve seat by measuring the tank volume defined by a channel from the outlet of the flow rate control device to the second valve seat by use of a pressure change and a temperature change between the first and second valve seats when a vacuum is provided between the first and second valve seats by the vacuum pump with the first cutoff valve being closed and the second cutoff valve being opened and then the gas filled between the outlet of the flow rate control device and the first valve seat is discharged between the first and second cutoff valves by opening the first cutoff valve from the valve closed-state, and by subtracting a known the volume defined by a channel from the first valve seat to the second valve seat from the tank volume.

16. The gas flow rate verification unit according to claim 1, wherein the control device samples pressure values detected by the pressure detector at a predetermined interval to calculate a gradient between a newly sampled pressure value and a sampled pressure value prior to the newly sampled pressure value and verifies a flow rate of the gas when the calculated gradient becomes within a measurable range.

17. The gas flow rate verification unit according to claim 1, wherein the control device samples the pressure values detected by the pressure detector at a predetermined interval to calculate a correlation coefficient with respect to the gradient of the newly sampled pressure value and verifies the flow rate of the gas when the calculated correlation coefficient becomes within a measurable range.

* * * * *